(12) United States Patent
Kondo et al.

(10) Patent No.: US 6,576,826 B2
(45) Date of Patent: Jun. 10, 2003

(54) TONE GENERATION APPARATUS AND METHOD FOR SIMULATING TONE EFFECT IMPARTED BY DAMPER PEDAL

(75) Inventors: Masao Kondo, Shizuoka-ken (JP); Satoshi Miyata, Shizuoka-ken (JP)

(73) Assignee: Yamaha Corporation, Hamamatsu (JP)

( * ) Notice: Subject to any disclaimer, the term of this patent is extended or adjusted under 35 U.S.C. 154(b) by 114 days.

(21) Appl. No.: 09/790,056

(22) Filed: Feb. 21, 2001

(65) Prior Publication Data

US 2001/0027714 A1 Oct. 11, 2001

(30) Foreign Application Priority Data

Feb. 22, 2000 (JP) ........................................ 2000-044251

(51) Int. Cl.[7] .............................. G10H 1/18; G10H 7/00
(52) U.S. Cl. ......................................... 84/615; 84/743
(58) Field of Search ........................ 84/615, 626, 653, 84/662, 743

(56) References Cited

U.S. PATENT DOCUMENTS 5,455,380 A * 10/1995 Matsuda et al. ............... 84/662
5,498,834 A * 3/1996 Inagaki et al. ................ 84/622
RE35,813 E 6/1998 Usa et al.

* cited by examiner

Primary Examiner—Jeffrey Donels
(74) Attorney, Agent, or Firm—Morrison & Foerster LLP

(57) ABSTRACT

While a normal tone of a designated pitch is being generated in response to key depression or other performance operation on a keyboard or other performance operation device, the tone is controlled in response to manipulation of a pedal or other auxiliary performance operator. Namely, once the auxiliary performance operator is manipulated during generation or sounding of the normal tone, generation of an additional tone related to the normal tone is initiated. In this case, in correspondence with ON/OFF operation of the auxiliary performance operator, a resonant tone is generated, as the additional tone, which is peculiar to the currently-generated normal tone and which is also peculiar to the ON/OFF operation of the auxiliary performance operator. Particularly, if the normal tone is still being generated when the auxiliary performance operator has been returned from the ON state to the OFF state, a returning tone related to the currently-generated normal tone is generated as another additional tone. The returning tone is a vibration-suppressed tone occurring as a mechanical vibration producing the resonant tone is ceased.

20 Claims, 11 Drawing Sheets

TONE GENERATION APPARATUS AND METHOD FOR SIMULATING TONE EFFECT IMPARTED BY DAMPER PEDAL

BACKGROUND OF THE INVENTION

The present invention relates generally to tone generation apparatus and methods, and more particularly to an improved tone generation apparatus and method which are suitable for use in attaining or simulating, by means of an electronic musical instrument, tones that are generated by manipulation of a damper pedal on a natural or acoustic piano.

As well known, when any one of keys is depressed on a natural or acoustic piano, the pivoting movement of the depressed key rotates a wippen about a capstan so that a hammer is caused to strike one or more strings (hereinafter also called a "string set") associated with the depressed key and then immediately rebound from the string set via an escapement mechanism. In the meantime, a damper of the depressed key moves apart from the string set, and thus the string set is allowed to vibrate freely at a tone pitch corresponding to the depressed key in such a manner that the vibration is transmitted by way of a bridge to a soundboard for audible production or sounding of the tone. Once the depressed key is released, the damper is brought back into contact with the string set to terminate the vibration of the string set.

When a damper pedal of the piano is depressed with a player's foot, the dampers of the individual keys are collectively moved apart from the string sets of all the keys, and thus all these string sets are allowed to freely vibrate together. If, in this damper-pedal-depressed state, there is any string set vibrating due to key depression of the player, the vibrating string set will excite vibration of one or more other string sets, which would bring about a resonant tone so that a piano tone with resonance is generated as a whole. Such a resonant tone constitutes a tone component peculiar to the piano.

To attain such a resonant tone electronically, i.e. by means of an electronic musical instrument, it is, in general, only necessary that a resonant tone component be added to a normal depressed-key tone in accordance with a pitch and tone volume level of the normal depressed-key tone, operating state of the damper pedal, etc. Techniques for electronically producing such a resonant tone are known, for example, from U.S. Pat. No. Re. 35813 and Japanese Patent Laid-open Publication No. SHO-60-91393. Manner of variation of the resonant tone component produced in the natural piano, however, would dynamically change depending on relative timing between the key operation and the damper pedal operation, depressed amount of the damper pedal, etc. For this reason, tones faithfully approximating acoustic piano tones can not be attained electronically, by merely starting generation of a resonant tone in response to depression of the damper pedal and controlling the tone volume level of the resonant tone in accordance with the depressed amount of the damper pedal. For example, in U.S. Pat. No. Re. 35813, there is disclosed a technique for imparting a resonant tone in response to activation or depression of the damper pedal. However, this disclosed technique is arranged to only terminate the resonant tone in response to deactivation or release of the damper pedal and thus can not provide appropriate dynamic control of the generated tone.

SUMMARY OF THE INVENTION

In view of the foregoing, it is a primary object of the present invention to provide an electronic tone generation apparatus, such as an electronic musical instrument, and electronic tone generation method which can appropriately simulate a damper pedal effect.

It is another object of the present invention to provide an tone generation apparatus and method which can dynamically control generation and characteristics of an additional tone, such as a resonant tone, related to a normal depressed-key tone on the basis of timing of the key depression and operation timing of an auxiliary performance operator and an operated amount of the auxiliary performance operator.

It is still another object of the present invention to provide a technique for electronically attaining a tone faithfully approximating an acoustic piano tone, by simulating tone components, such as a damper-pedal-excited additional tone and damper-pedal-off additional tone, with a hardware setup of a relatively small scale and relatively small amount of information processing.

To accomplish the above-mentioned object, the present invention provides a tone generation apparatus which comprises: a performance operation device adapted to instruct generation of a tone; an auxiliary performance operator having at least two operation states: an ON operation state; and an OFF operation state; and a processor device coupled with the performance operation device and the auxiliary performance operator. The processor device is adapted to: generate a normal tone in accordance with an instruction given by the performance operation device; and start, when the auxiliary performance operator is operated while the normal tone is being generated, generation of additional tones that correspond to the at least two operation states of the auxiliary performance operator and are related to the normal tone being generated.

The tone generation apparatus of the present invention thus arranged can generate or sound additional tones, related to the currently-generated normal or main tone, which correspond to the ON operation state and OFF operation state of the auxiliary performance operator and have respective unique characteristics.

In a preferred implementation, the processor device is further adapted to determine a tone volume level, at the beginning of generation, of the additional tone in accordance with an elapsed time from the beginning of generation of the normal tone to the beginning of generation of the additional tone. With this arrangement, the additional tone related to the currently-generated normal tone can be controlled to have a tone volume level corresponding to a sounding state of the normal tone.

As an example, the processor device may be further adapted to determine a volume level, at the beginning of generation, of the additional tone, in accordance with a tone volume level of the normal tone at beginning of generation of the additional tone. With this arrangement, the additional tone related to the currently-generated normal tone can be controlled to have a tone volume level corresponding to a sounding state of the normal tone.

In another preferred implementation, the auxiliary performance operator is capable of generating information indicative of an operated amount thereof including an intermediate operation value between the ON operation state and the OFF operation state. In this case, the processor device is further adapted to control at least one of decay rates of the normal tone and the additional tone in accordance with the information indicative of the operated amount generated by the auxiliary performance operator. With this arrangement, the tone volume levels of the currently-generated normal tone and related additional tone can be varied in accordance with an operated amount of the auxiliary performance operator; for example, the tone volume levels of the currently-generated normal tone and related additional tone can be controlled to not vary over time in such a manner that they can have characteristics similar to those of decay tones generated by a natural or acoustic musical instrument.

In another preferred embodiment, the processor device is adapted to additionally generate a returning tone related to the normal tone being generated, provided that the normal tone is being generated when the auxiliary performance operator has returned from the ON operation state to the OFF operation state. This arrangement permits appropriate simulation of a tone variation that would occur as the auxiliary performance operator, controlling the generation or sounding of the additional tone related to the normal tone, is deactivated or brought to the OFF operation state.

According to another aspect of the present invention, there is provided a tone generation apparatus which comprises: a performance operation device adapted to instruct generation of a tone; an auxiliary performance operator having at least two operation states: an ON operation state; and an OFF operation state; and a processor device coupled with the performance operation device and the auxiliary performance operator, the processor device being adapted to: generate a normal tone in accordance with an instruction given by the performance operation device; and start, when the auxiliary performance operator is brought to the OFF operation state while the normal tone is being generated, generation of an additional tone that is related to the normal tone being generated. This inventive arrangement permits impartment of a special additional tone (e.g., returning tone) when the auxiliary performance operator, such as a pedal, is deactivated or brought to the OFF operation state, thereby effectively contributing to appropriate dynamic tone control.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, rather than a computer or other general-purpose type processor capable of running a desired software program.

While the embodiments described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the objects and other features of the present invention, its embodiments will be described in greater detail hereinbelow with reference to the accompanying drawings, in which.

DETAILED DESCRIPTION OF EMBODIMENTS

Figure 1:
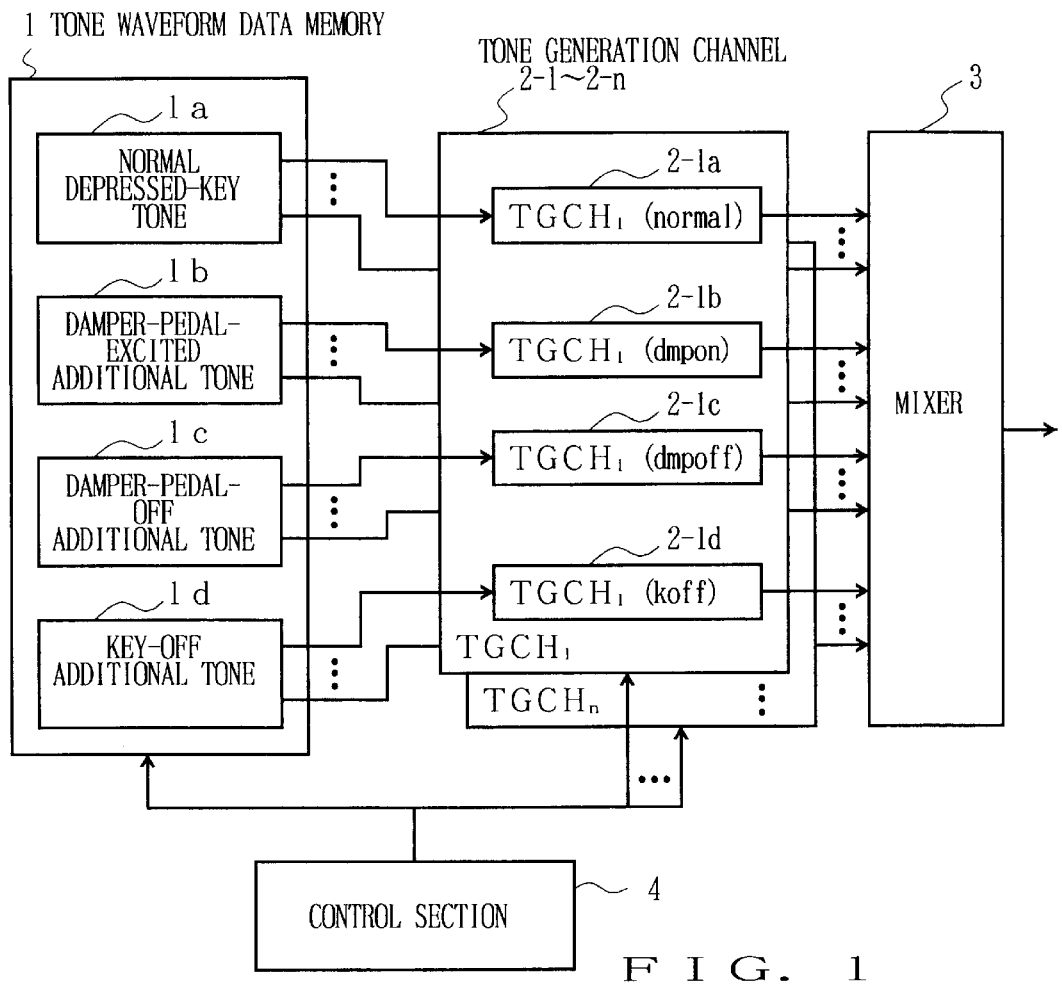
FIG. 1 is a block diagram showing a general setup of a tone generation apparatus in accordance with an embodiment of the present invention.

FIG. 1 is a block diagram showing a general setup of a tone generation apparatus in accordance with an embodiment of the present invention. As shown, the tone generation apparatus includes a tone waveform data memory 1, in which tone waveform data of each desired instrument tone color or timbre are stored as a set of a plurality of tone components as will be later described in detail. More specifically, the tone waveform data memory 1 includes: an area 1a for storing waveform data of normal depressed-key tones or main tone components corresponding to depressed keys (hereinafter called an "normal depressed-key tone storage area"); an area 1b for storing waveform data of damper-pedal-excited additional tones (hereinafter called a "damper-pedal-excited additional tone storage area"); an area 1c for storing waveform data of damper-pedal-off additional tones (hereinafter called a "damper-pedal-off additional tone storage area"); and an area 1d for storing waveform data of key-off additional tones (hereinafter called a "key-off additional tone storage area").

Here, each of the normal depressed-key tones stored in the normal depressed-key tone storage area 1a represents a main tone component to be generated or sounded in response to depression, by a human player, of a corresponding key (e.g., on a piano keyboard) with a tone pitch of the depressed key;

in the case of the piano tones, each of the normal depressed-key tones represents exactly a main tone component generated by a hammer striking a string set (i.e., a string striking sound) associated with the depressed key.

Each of the damper-pedal-excited additional tones is, as explained above in relation to the related prior art, a resonant tone component which is generated by the vibrating string set of the depressed key exciting vibration of one or more other string sets having been released or disengaged from dampers via activation of the damper pedal functioning as an auxiliary performance operator. Specifically, each of the damper-pedal-excited additional to be tones stored in the damper-pedal-excited additional tone storage area 1b is prepared by determining a difference between a sampled waveform of a tone as a given key is depressed with the damper pedal depressed (i.e., in a damper pedal ON state) and a sampled waveform of a tone generated as the same key is depressed without the damper pedal being depressed (i.e., in a damper pedal OFF state).

Further, each of the damper-pedal-off additional tones stored in the damper-pedal-off additional tone storage area cl represents a distorted tone component that is generated as the damper pedal is returned from the depressed position or ON state to the released position or OFF state and thus each freely-vibrating string set is ceased, by the corresponding damper, from vibrating any further. Strictly speaking, there are two types of damper-pedal-off additional tones in the acoustic piano. The first type of damper-pedal-off additional tone is yielded from each string set continuing to generate the corresponding normal depressed-key tone (or main tone component corresponding to the depressed key) even after the key in question is released, and the second type of damper-pedal-off additional tone is yielded from each string set generating a resonant tone. However, because the second type of damper-pedal-off additional tone has a very small tone volume level, the instant embodiment is arranged so as not to generate such a second type of damper-pedal-off additional tone that would be generated as the damper pedal is released or brought back to the OFF state on the acoustic piano.

Therefore, each of the damper-pedal-off additional tones to be stored in the damper-pedal-off additional tone storage area 1c may be prepared, for example, by determining a difference between 1) a sampled waveform of a release portion (i.e., a portion where the string vibration is suppressed to disappear gradually) of a tone generated as the key is released in the damper pedal ON state and then the damper pedal is returned to the released position and 2) a waveform obtained by decaying a sampled waveform with the damper pedal kept depressed and at the same tone volume level decay rate as the release portion of the former waveform after the time point of the damper pedal release.

Further, each of the key-off additional tones stored in the key-off additional tone storage area 1d represents a distorted tone component generated as a given key is released to cause the damper to be brought back into contact with the string set associated with the released key. The key-off additional tone is generated together with or in overlapping relation to the normal depressed-key tone generated at the time of the key release. Each of the key-off additional tones may be prepared, for example, by determining a difference between a sampled waveform of a release portion of a normal depressed-key tone generated as the key is released and a waveform obtained by decaying the normal depressed-key tone waveform with the key left depressed and at the same tone volume level decay rate as the release portion of the former waveform after the time point of the key release.

Because the above-mentioned damper-pedal-off additional tones are similar in the tone generating principles to the key-off additional tones, the tone waveforms of the key-off additional tones may be used in place of the tone waveforms of the damper-pedal-off additional tones, in which case the necessary number of tone waveform sampling operations and necessary memory capacity for the tone waveform sampling can be reduced significantly in the instant embodiment.

Further, because the key-off additional tones and damper-pedal-off additional tones are low in tone volume level and have short duration, audible production or sounding of these tone components may be omitted.

The above-mentioned tone components are prepared and stored in the tone waveform data memory 1, for each of the keys or for each key range including a plurality of the keys of mutually-close tone pitches.

Further, in FIG. 1, reference numerals 2-1 to 2-n represent first to nth tone generation channels of a tone generator (T.G.) of the tone generation apparatus. Each of the first to nth tone generation channels 2-1 to 2-n includes a plurality of tone generating channels corresponding to the above-mentioned tone components. For example, the first tone generation channel 2-1 includes the tone generating channels 2-1a, 2-1b, 2-1c and 2-1d for generating the normal depressed-key tone component, damper-pedal-excited additional tone, damper-pedal-off additional tone and key-off additional tone, respectively, for each designated key. Similarly, the remaining second to nth tone generation channels each include tone generating channels for generating the individual tone components for each designated key.

In each of the tone generating channels, the tone volume level of the corresponding tone component is controlled dynamically by changing, on a real-time basis, a coefficient to be multiplied with the tone waveform of the tone component taking into account decay characteristics represented by the tone waveform data. Where an envelope waveform generator is employed, the tone volume level of each of the tone components can be controlled dynamically by controlling, on the real-time basis, the amplitude level and/or variation rate of an envelope waveform for that tone component.

The tone generation channels are capable of simultaneously generating a plurality of tones, by being constructed as separate hardware circuits (e.g., in the form of tone generator ICs) and/or by performing a time-divisional multiplexing process. In the event that the number of the tone generation channels instructed to simultaneously generate tones exceeds the processing capacity of the tone generator, a so-called "truncate" process is carried out, where the necessary tone generation processing is performed in ascending order of importance of the designated tone pitches and/or tone components so that any one of the currently available tone generation channels can be assigned to each newly-designated tone pitch and/or tone component.

The tone generation apparatus of the invention also includes a mixer 3 which outputs a mixed tone by mixing together the outputs from the tone generating channels and tone generation channels first to nth tone generating channels.

The tone generation apparatus further includes a control section 4 which is implemented by a keyboard, damper pedal, CPU and the like and which generates performance information and allocates the thus-generated performance information to the first to nth tone generation channels as appropriate. In some cases, performance information is read out from a storage device or supplied from external equipment or a server on a communication network.

Examples of information, which are to be output from the control section 4 to the tone waveform data memory 1 for selective control of the tone waveform data, include tone color information. In a situation where the tone waveform is to be varied in accordance with the key or key range, key code (KC) or pitch information, which is among key manipulation information, is included in the information to be output from the control section 4 to the tone waveform data memory 1. Further, where the tone waveform is to be varied in accordance with a key touch, key touch information is included in the information to be output from the control section 4 to the tone waveform data memory 1. Tone waveform of a desired pitch can be acquired by reading out samples of the tone waveform data from the memory 1 at a sampling frequency corresponding to the key code (KC) or pitch.

Further, examples of information to be output from the control section 4 to the tone generator for control of any of the first to nth tone generation channels include key depression (key-on) timing information and key release (key-off) timing information which is also among the key manipulation information, tone volume information, damper-pedal depression amount (DMPPEDAL) information. In a situation where the tone volume level of the tone waveform is to be varied (scaled) in accordance with the key touch, key touch information is output from the control section 4 to the tone generator. Where the tone volume level of the tone waveform is to be varied in accordance with the tone pitch, key code or pitch information is included in the information to be output from the control section 4 to the tone generator. Further, where selection and mixing ratio of the tone components are to be varied in accordance with the tone color, tone color information is included in the information to be output from the control section 4 to the tone generator.

In the instant embodiment of the present invention, the damper pedal can operate in two operation modes: switching operation mode; and continuous operation mode. When the damper pedal is in the switching operation mode, the tone volume level decay rate is maintained at a releasing decay rate corresponding to a state of the string set contacted by the damper, until the damper-pedal depression amount reaches a predetermined value. Once the damper-pedal depression amount has reached the above-mentioned predetermined value, the tone volume level decay rate is switched to a sustaining decay rate corresponding to a state of the string set released or freed from the damper.

Figure 2:
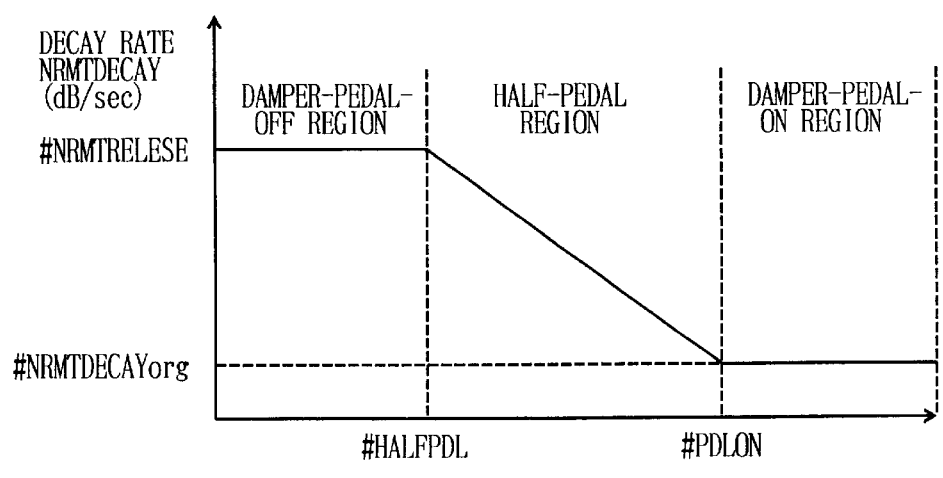
FIG. 2 is a graph schematically showing an exemplary corresponding relationship between a damper-pedal depression amount as an auxiliary performance operator and a tone volume level decay rate of a normal depressed-key tone when the damper pedal is in a continuous operation mode.

The following paragraphs describe operation of the instant embodiment when the damper pedal is in the continuous operation mode. FIG. 2 is a graph schematically showing an exemplary corresponding relationship between the damper-pedal depression amount and the tone volume level decay rate of a normal depressed-key tone when the damper pedal as the auxiliary performance operator is in the continuous operation mode. In FIG. 2, the horizontal axis represents the damper-pedal depression amount (DMPPEDAL), while the vertical axis represents the volume decay rate of the normal depressed-key tone (NRMTDECAY dB/sec).

In the illustrated example, the volume decay rate is set to and kept at a greatest, releasing decay rate (#NRMTRELEASE) in a damper-pedal-off region of the damper-pedal depression amount occurring from the beginning of the OFF state of the damper pedal to a half-pedal lower limit value (#HALFPDL). In a subsequent half-pedal region occurring between the half-pedal lower limit value (#HALFPDL) and a damper-pedal-on lower limit value (#PDLON), the decay rate is controlled to decrease as the damper-pedal depression amount becomes greater.

Specifically, in the illustrated example of FIG. 2, the tone volume level decay rate is lowered linearly from the releasing decay rate (#NRMTRELEASE) to a lowest, initial (i.e. free) decay rate (#NRMTDECAYorg). In a damper-pedal-on region occurring between the above-mentioned damper-pedal-on lower limit value (#PDLON) and the greatest damper-pedal depression amount, the tone volume level decay rate is set to and kept at the free decay rate (#NRMTDECAYorg) corresponding to the state in which the string set is allowed to freely vibrate without being influenced by the damper pedal.

Note that although the relationship between the damper-pedal depression amount and the tone volume level decay rate of a given normal depressed-key tone has been described above, characteristics similar to the above-mentioned are also applied in the instant embodiment to the relationship between the damper-pedal depression amount and the tone volume level decay rate of each damper-pedal-excited additional tone, damper-pedal-off additional tone and key-off additional tone.

FIGS. 3 to 7 are diagrams explanatory of how the tone generation apparatus of the present invention dynamically controls characteristics of the individual tone components on the basis of a depressed timing of the damper pedal (i.e., a particular time at which the damper pedal has been depressed by a human player) and depressed amount of the damper pedal.

In these figures, a ratio between a volume variation curve and tone volume levels of each of the tone components qualitatively indicates a ratio found in actual tone waveform data. Also, in these figures, it is assumed that the tone volume level enters the damper-pedal-on region the instant the damper pedal is depressed, and the tone volume level decay rate in the half-pedal region when the damper pedal is returning to the released position is shown as being set to a predetermined value intermediate between the releasing decay rate and the free decay rate.

Figure 3:
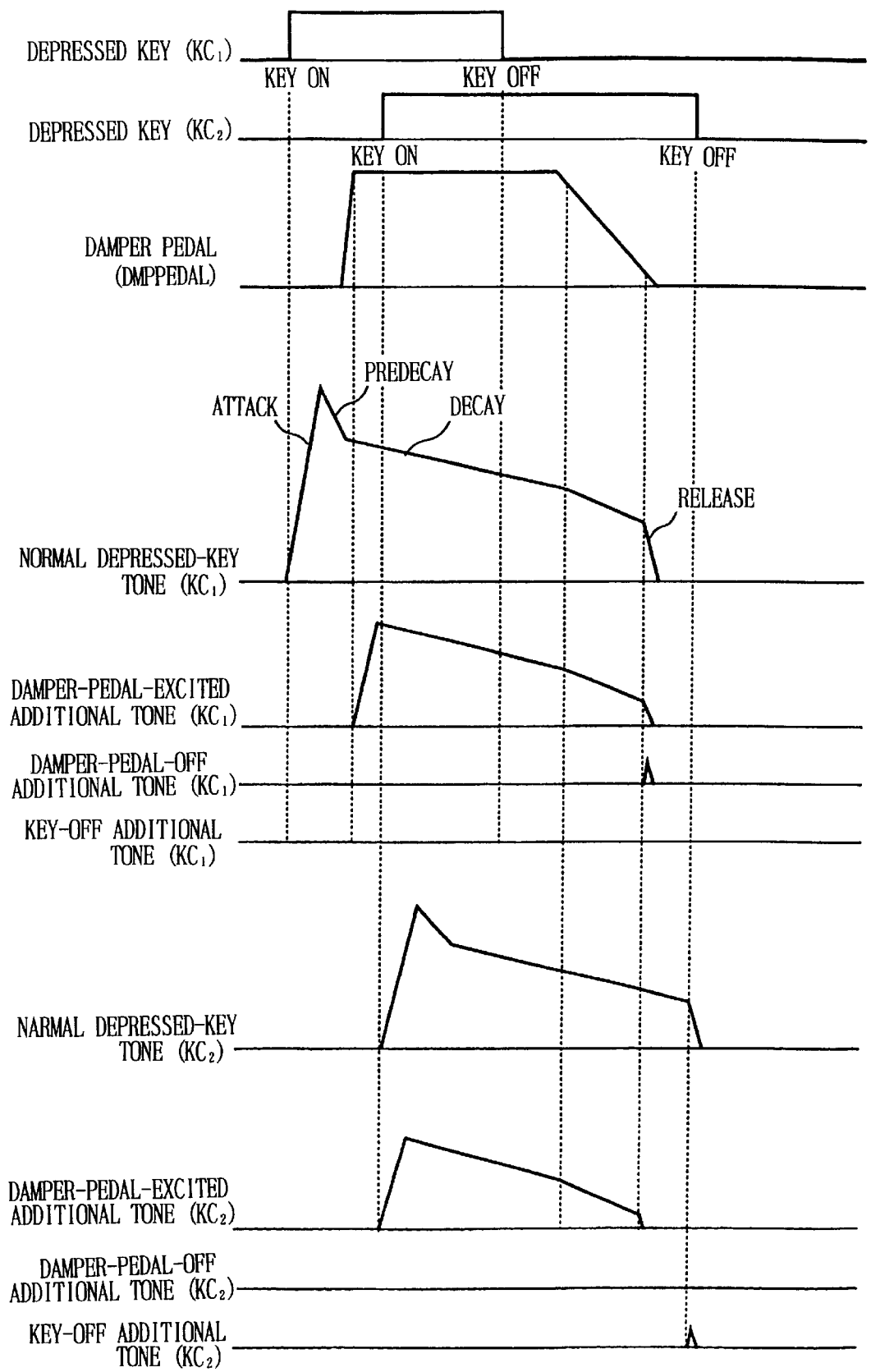
FIG. 3 is a diagram showing an example of tone volume control of individual tone components in relation to a first example of manipulation of the damper pedal.

More specifically, FIG. 3 is a diagram showing an example of tone volume control of the individual tone components in relation to a first example of the manipulation of the damper pedal. In the illustrated example of FIG. 3, the damper pedal is turned ON or depressed after depression (key-on) of a first key (whose key code is KC1), then a second key (whose key code is KC2) is depressed, then the damper pedal is turned OFF or released after release (key-off) of the first key (KC1), and then the second key (KC2) is released. Normal depressed-key tone (KC1) is caused to rise simultaneously with the depression of the first key (KC1), and the tone volume level of the normal depressed-key tone enters its decay phase by way of attack and pre-decay phases and gradually decays at a relatively mild decay rate. Greatest tone volume level of the tone in the attack phase is determined in accordance with the key code (KC1), key touch (TOUCH1), etc. of the first key. When the damper pedal is turned ON, a damper-pedal-excited additional tone is caused to rise with the normal depressed-key tone left unchanged. If the damper pedal is turned ON when the first key (KC1) is in the depressed state, the string sets associated with all the other released keys are brought to a disengaged or free-vibrating state (i.e., a state where the string sets are moved apart from their respective dampers so as to vibrate freely), so that there is produced a vibrating sound or damper-pedal-excited additional tone resonating with the vibrating string set associated with the depressed first key (KC1). Thus, the instant embodiment can appropriately simulate a vibrating sound resonating with a vibrating string set associated with each depressed first key in the damper pedal ON state of the acoustic piano.

If the tone generating or sounding mechanism of the acoustic piano is to be simulated as it is, there is a need to prepare a damper-pedal-excited additional tone for each and every string set resonating with the vibrating string set of the depressed key, which would unavoidably require an enormous memory capacity and enormous number of tone generating channels. However, in the instant embodiment of the invention, a single resonant tone waveform is stored, for each key (KCx) corresponding to a string set functioning as a vibration excitation source, in the damper-pedal-excited additional tone storage area 1b of FIG. 1.

Note that two or more keys, rather than just one key, are sometimes depressed at a time. In FIG. 3, the first key (KC1) and second key (KC2) are shown as being depressed in an overlapping fashion. In such a case, a damper-pedal-excited additional tone is prepared for each one of the depressed keys, and the thus-prepared damper-pedal-excited additional tones are then combined to overlap each other.

Note that all the damper-pedal-excited additional tones, except for the one corresponding to a given depressed key, stored in the tone waveform data memory 1 are prepared without their corresponding keys being actually depressed. Therefore, the damper-pedal-excited additional tone corresponding to the first key (KC1) contains a resonant tone for the string set associated with the second key (KC2), and similarly the damper-pedal-excited additional tone corresponding to the second key (KC2) contains a resonant tone for the string set associated with the first key (KC1). Thus, if the damper-pedal-excited additional tones corresponding to two or more keys are sounded in an overlapping fashion, the sounded tones will contain the resonant tone components corresponding to the currently depressed keys. However, because the generation of such resonant tone components has only a nominal influence, only one damper-pedal-excited additional tone is stored, for each key (Kx), in the tone waveform data memory 1 irrespective of whether any other key is being depressed simultaneously with the key, for purposes of simplification of the necessary construction and processing.

Because the resonant tone is produced by the vibrating energy of the normal depressed-key tone, the tone volume levels, at the rising phase, of the damper-pedal-excited additional tones corresponding to the first and second keys (KC1 and KC2) are first controlled in accordance with the respective key codes (KC1 and KC2) and touches (TOUCH1 and TOUCH2) of the first and second keys. In addition, the maximum tone volume levels, at the rising phase, of the damper-pedal-excited additional tones are controlled in accordance with tone-generation lasting times, i.e., elapsed times, from the rising points of the normal depressed-key tones to the rising points of the damper-pedal-excited additional tones corresponding to the first and second keys.

In the instant embodiment, the maximum tone volume levels, at the rising phase, of the damper-pedal-excited additional tones are lowered as the tone-generation lasting times become longer, and the lowering degree of the maximum tone volume levels is determined, for example, in accordance with the key codes (KC1 and KC2).

Alternatively, the tone volume levels, at the rising phase, of the damper-pedal-excited additional tones may be controlled in accordance with either the tone volume levels of the normal depressed-key tones or a combination of the tone-generation lasting times and tone volume levels of the normal depressed-key tones.

Because the damper pedal is in the ON or depressed state when the first key (KC1) is released, the normal depressed-key tone and damper-pedal-excited additional tone corresponding to the first key (KC1) are both caused to be generated at the same tone volume decay rate. In this case, no key-off additional tone is generated for the first key (KC1).

Once the damper-pedal depression amount enters the half-pedal region in response to reduction of the damper-pedal depression, the decay rates of the normal depressed-key tone corresponding to the first key (KC1) and damper-pedal-excited additional tones corresponding to the first and second keys (KC1 and KC2) are raised gradually, as shown in FIG. 2, in accordance with the current value of the damper-pedal depression amount. However, the normal depressed-key tone corresponding to the second key (KC2) is left uninfluenced because the second key (KC2) is still in the depressed state.

Once the generation of the damper-pedal-excited additional tone is initiated, the control of the additional tone based on the damper-pedal depression amount is carried out only with variation in the tone volume level decay rate; in this case, the tone volume level itself is not controlled directly. As a consequence, the tone volume level of the damper-pedal-excited additional tone will not be raised in response to the manipulation of the damper pedal. This control is executed in order to prevent the tone volume level of the decaying piano tone from being raised by the manipulation of the damper pedal. Thus, when a tone that need not approximate a natural instrument tone is to be generated, the damper-pedal-excited additional tone may be controlled freely.

Further, once the damper pedal is turned OFF or released, the tone volume levels of the normal depressed-key tone corresponding to the first key (KC1) and damper-pedal-excited additional tones corresponding to the first and second keys (KC1 and KC2) are decayed rapidly at their respective releasing decay rates. Also, as the normal depressed-key tone and damper-pedal-excited additional tone corresponding to the currently-released first key (KC1) are muted or deadened, a damper-pedal-off additional tone (KC1) is generated. At this point, the instant embodiment generates no damper-pedal-off additional tone as the damper-pedal-excited additional tone corresponding to the currently-depressed second key (KC2) is released, as already explained above in relation to FIG. 1.

Because the damper-pedal-off additional tone is also influenced by the vibrating energy of the normal depressed-key tone, its tone volume level at the rising phase is controlled in accordance with the current tone-generation lasting time (elapsed time from the beginning of sounding of the tone up to the current time point) and current tone volume level of the normal depressed-key tone, etc., in a similar manner to the tone volume level of the damper-pedal-excited additional tone. Following the rising phase, the decay rate of the damper-pedal-off additional tone is controlled in accordance with the damper-pedal depression amount and characteristics similar to those shown in FIG. 2.

Finally, as the second key (KC2) is released, a key-off additional tone corresponding to the second key (KC2) is generated because the damper pedal has already been brought back into the OFF or released state prior to the release of the second key (KC2). The tone volume level, at the rising phase, of the key-off additional tone is also controlled in accordance with the current tone-generation lasting time and current tone volume level of the normal depressed-key tone, etc. Following the rising phase, the decay rate of the key-off additional tone is controlled in accordance with the damper-pedal depression amount and characteristics similar to those shown in FIG. 2.

Note that when the damper-pedal depression amount is in the half-pedal region or damper-pedal-off region, the decay rates of the damper-pedal-off additional tones corresponding to the first and second keys (KC1 and KC2) are controlled to be identical to each other as long as the damper-pedal depression amount (DMPPEDAL) is the same for both the damper-pedal-off additional tones. However, because the first key (KC1) is in the released state when the damper-pedal depression amount is in the half-pedal region, the normal depressed-key tone of the first key (KC1) is also controlled to cease from vibrating or sounding in accordance with the current damper-pedal depression amount (DMPPEDAL). In contrast, because the second key (KC2) is still in the depressed state when the damper-pedal depression amount is in the half-pedal region, the normal depressed-key tone of the second key (KC2) is not controlled to cease from vibrating or sounding in accordance with the current damper-pedal depression amount (DMPPEDAL). Thus, by setting the decay rate of the damper-pedal-excited additional tone of the currently-released first key (KC1) to be greater than the decay rate of the damper-pedal-excited additional tone of the currently-depressed second key (KC2), the decay rates of the damper-pedal-excited additional tones excited by the string vibration corresponding to the normal depressed-key tone can even further approach those in the sounding mechanism of the acoustic piano.

Figure 4:
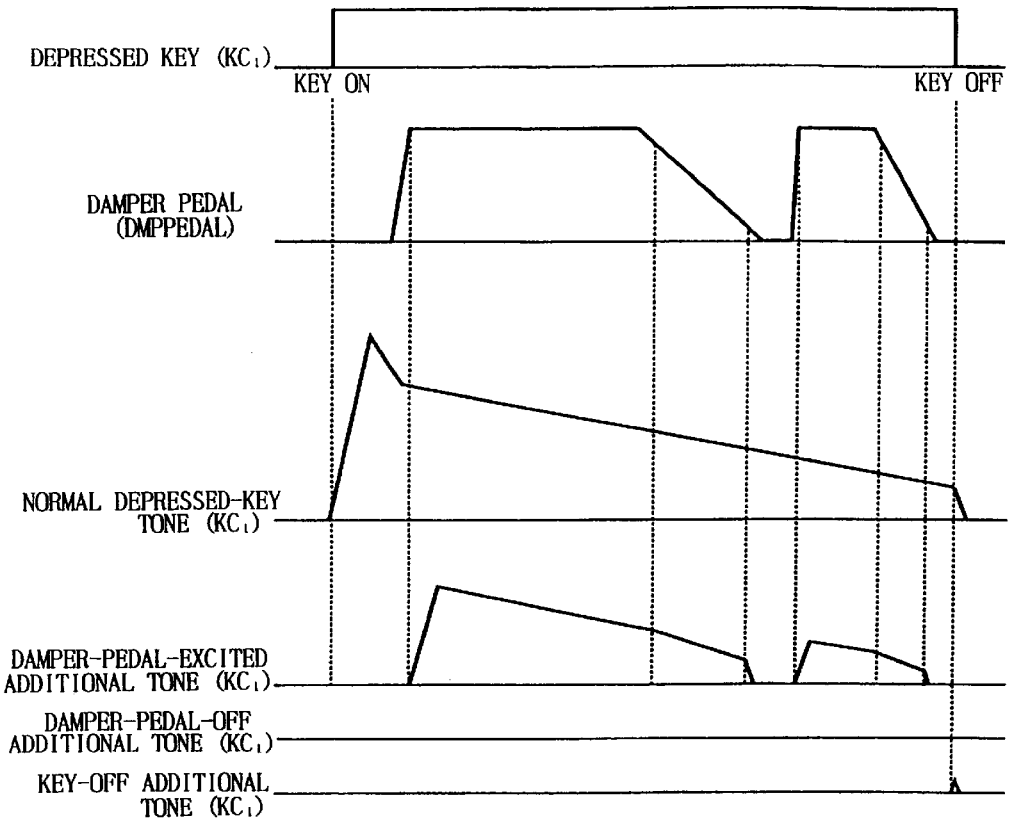
FIG. 4 is a diagram showing another example of the tone volume control of the individual tone components in relation to a second example of manipulation of the damper pedal.

FIG. 4 is a diagram showing another example of the tone volume control of the individual tone components in relation to a second example of the manipulation of the damper pedal. In this illustrated example, the damper pedal is depressed twice while the key (KC1) is in the depressed state.

More specifically, in the illustrated example of FIG. 4, a first damper-pedal-excited additional tone is caused to rise in response to the first depression of the damper pedal, and the damper-pedal-excited additional tone is decayed rapidly as the damper pedal is released. Then, a second damper-pedal-excited additional tone is caused to rise in response to the second depression of the damper pedal.

Here, the tone volume level, at the rising phase, of the first damper-pedal-excited additional tone is controlled in accordance with the tone-generation lasting time and tone volume level of the normal depressed-key tone, etc. identified at the time of the first depression of the damper pedal. Similarly, the tone volume level, at the rising phase, of the second damper-pedal-excited additional tone is controlled in accordance with the tone-generation lasting time and tone volume level of the normal depressed-key tone, etc. identified at the time of the second depression of the damper pedal. Following the rising phase, the decay rate of the second damper-pedal-excited additional tone is controlled in accordance with the damper-pedal depression amount and characteristics similar to those shown in FIG. 2. Note that similar control sequence applies to a situation where the damper pedal is turned ON and OFF more than twice.

Figure 5:
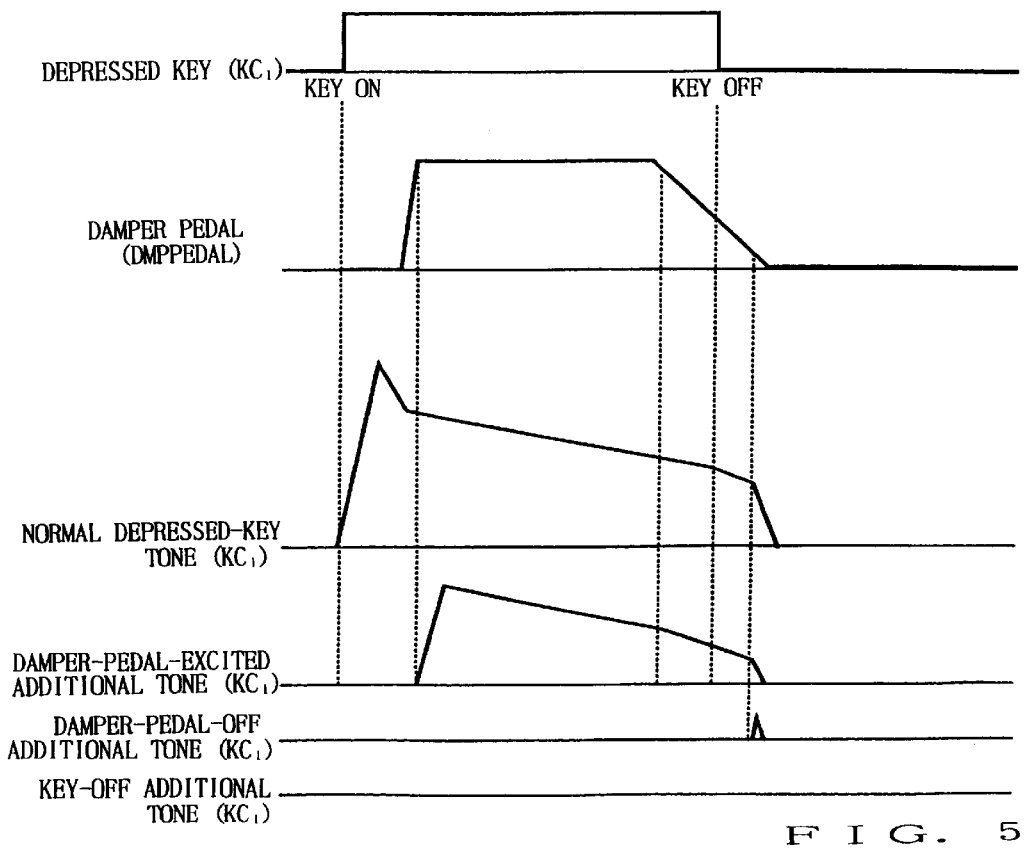
FIG. 5 is a diagram showing still another example of the tone volume control of the individual tone components in relation to a third example of the manipulation of the damper pedal.

FIG. 5 is a diagram showing still another example of the tone volume control of the individual tone components in relation to a third example of the manipulation of the damper pedal. In this illustrated example, the key (KC1) is released while the damper-pedal depression amount is in the half-pedal region. Following the release of the key (KC1), the normal depressed-key tone of the key (KC1) is controlled in accordance with the current damper-pedal depression amount and characteristics similar to those shown in FIG. 2. In this case, no key-off additional tone is generated.

In a case where the decay rate of the damper-pedal-excited additional tone is controlled only in accordance with the damper-pedal depression amount (DMPPEDAL), the decay rate does not vary irrespective of the release of the key (KC1). However, after the release of the key (KC1), the normal depressed-key tone of the key (KC1), which is an exciting source of the damper-pedal-excited additional tone, will also have its vibration suppressed in accordance with the current damper-pedal depression amount. Therefore, by setting the decay rate to be greater in the key-released state than in the in the key-depressed state, it is possible to even more closely simulate the sounding mechanism of the acoustic piano.

Note that if the release of the key takes place at the same time as the release of the damper pedal (damper pedal OFF operation), key-off and damper-pedal-off additional tones are generated simultaneously. In this case, it is preferable to either control the respective tone volume levels of the key-off and damper-pedal-off additional tones to decrease, or suppress the generation or sounding of either one of the two tone components.

Figure 6:
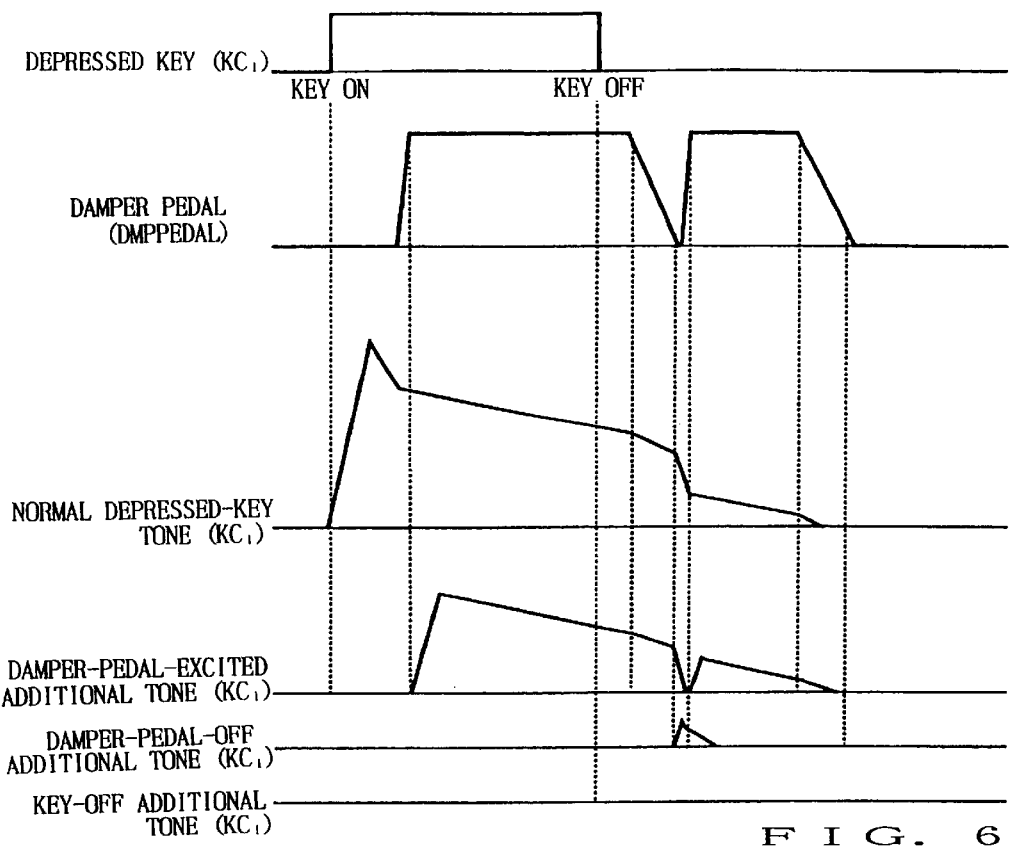
FIG. 6 is a diagram showing still another example of the tone volume control of the individual tone components in relation to a forth example of the manipulation of the damper pedal.

FIG. 6 is a diagram showing still another example of the tone volume control of the individual tone components in relation to a forth example of the manipulation of the damper pedal. In this illustrated example, the damper pedal is released and again depressed after release of the key (KC1). First damper-pedal-off additional tone is generated in response to the release of the damper pedal. If the damper pedal is again depressed during the generation or sounding of the damper-pedal-off additional tone, the damper-pedal-off additional tone is controlled to decline at a decay rate corresponding to the damper-pedal depression amount and characteristics similar to those shown in FIG. 2. Note that because the damper-pedal-off additional tone has a small tone volume level and short tone-generation lasting time or duration, it is also possible to cause the decay rate of the currently-generated damper-pedal-off additional tone to be not controlled by the immediately following damper pedal manipulation.

Further, in the illustrated example of FIG. 6, the damper-pedal-excited additional tone is generated for the second time in response to the second depression of the damper pedal. Because the normal depressed-key tone has already decayed due to the key release, it is not preferable to control the tone volume level, at the rising phase, of the damper-pedal-excited additional tone only in accordance with the tone-generation lasting time of the normal depressed-key tone; it is preferable that the tone volume level, at the rising phase, of the damper-pedal-excited additional tone be controlled, taking into account the tone volume level of the normal depressed-key tone identified at the time of the second depression of the damper pedal. It is preferable that the second damper-pedal-off additional tone be controlled, taking into account the tone volume level of the normal depressed-key tone at the time of the second release of the damper pedal; however, the second damper-pedal-off additional tone is not generated in the illustrated example, because the tone volume level of the normal depressed-key tone has already decayed fully.

Figure 7:
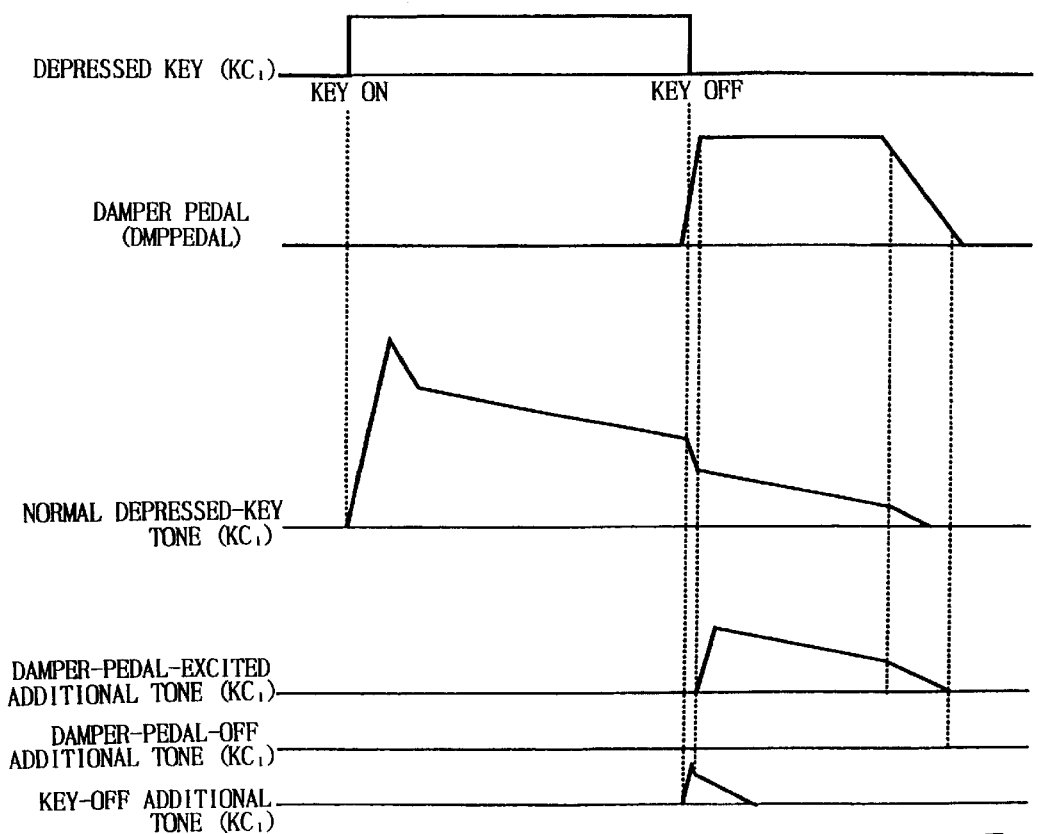
FIG. 7 is a diagram showing still another example of the tone volume control of the individual tone components in relation to a fifth example of the manipulation of the damper pedal.

FIG. 7 is a diagram showing still another example of the tone volume control of the individual tone components in relation to a fifth example of the manipulation of the damper pedal. In this illustrated example, the damper pedal is depressed immediately following release of the key (KC1). When the damper pedal is depressed during generation of a key-off additional tone responsive to the release of the key (KC1), the key-off additional tone is also controlled to decline at a decay rate corresponding to the damper-pedal depression amount and characteristics similar to those shown in FIG. 2. Note that because the key-off additional tone has a small tone volume level and short tone-generation lasting time or duration, it is also possible to cause the decay rate of the currently-generated key-off additional tone to be not controlled by the immediately following damper pedal manipulation.

In the above-described examples, the damper pedal is arranged to be placed in the ON state immediately in response to depression, by the human player, of the damper pedal. However, if the damper pedal is depressed slowly or at a low depression-amount increasing rate, the tone volume level, at the rising phase, of the damper-pedal-excited additional tone may be determined in accordance with a damper-pedal depression amount identified at a predetermined time after the half-pedal lower limit (#HALFPDL) is exceeded. Alternatively, the tone volume level, at the rising phase, of the damper-pedal-excited additional tone may always be kept constant, and only the decay rate of the additional tone following the rising phase may be controlled in accordance with the current damper-pedal depression amount.

Now, a description will be made about an electronic hardware setup implementing the tone generation apparatus of the present invention, with primary reference to FIG. 8.

Figure 8:
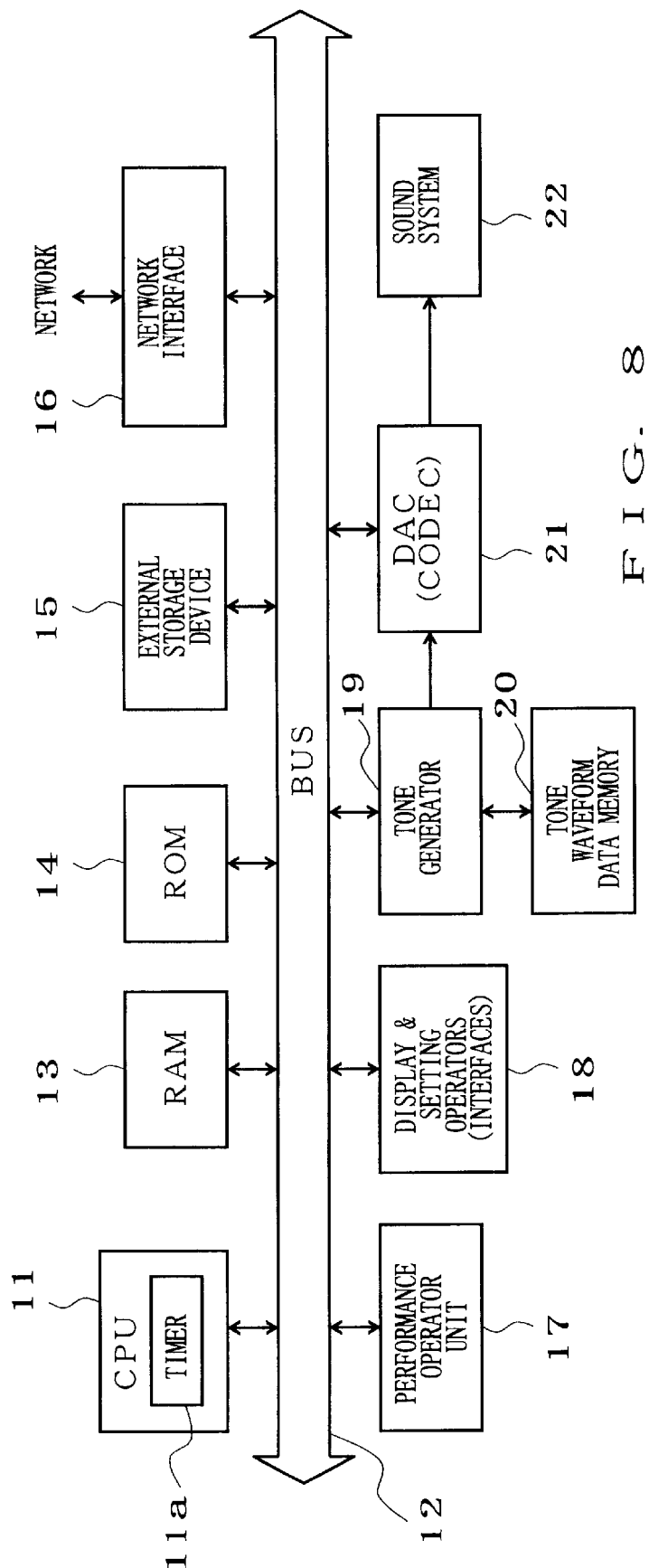
FIG. 8 is a block diagram showing an electronic hardware setup implementing the tone generation apparatus of the present invention.

As shown in FIG. 8, the tone generation apparatus includes a CPU (Central Processing Unit) 11 that controls various operations of the entire tone generation apparatus. The CPU 11 includes a built-in timer 11a for controlling interrupt timing and the like of a program and counting a tone-generation lasting time of each designated normal depressed-key tone. Reference numeral 12 represents a bus to be used for data transmission between various components of the tone generation apparatus. The tone generation apparatus also includes a RAM (Random Access Memory) 13 where there are provided a working area to be used by the CPU 11 when carrying out various processes, data buffer area, etc. Reference numeral 14 is a ROM (Read-Only Memory) having stored therein control programs to be run by the CPU 11 to carry out the various processes, music data, pre-set data, music piece data for automatic performance, etc.

The tone generation apparatus also includes an external storage device 15 that includes at least one of an FDD (Floppy Disk Drive), HDD (Hard Disk Drive), CD-ROM (Compact Disk Read-Only Memory) drive, MO (Magneto Optical disk) drive, DVD (Digital Versatile Disk) drive and the like. Tone color data and music piece data are stored in the external storage device 15; data other than those stored in the ROM 14 may be stored in the external storage device 15. In the case where the external storage device 15 is in the form of the HDD, any desired control program and data may be prestored in the HDD, rather than in the ROM 14, so that by reading such a control program and data into the RAM 13, the CPU 11 is allowed to operate in exactly the same way as where the control program and data are contained in the ROM 14. Further, where the external storage device 15 includes the CD-ROM drive, any desired control program and data prestored in the CD-ROM drive are read out and stored into the HDD.

Further, reference numeral 16 represents one or more network interfaces for connection to any of communication networks such as a LAN (Local Area Network) like an Ethernet and IEEE1394 (mLAN), telephone line network and the Internet. The tone generation apparatus also includes MIDI interfaces for connection to a MIDI keyboard, external tone generator device, and RS-232C interface for connection to a personal computer and the like.

Reference numeral 17 collectively represents a performance operator unit including a keyboard, pitch-bend wheel and modulation wheel. Some or all of such performance operators may be dispensed with in a situation where performance information is input from an external source to the tone generation apparatus via the MIDI interface or the like. Reference numeral 18 collectively represents a display device, such as a liquid crystal display (LCD), various setting operators, and interfaces associated with the display device and operators.

The tone generator 19 has the tone generation channels 2-1 to 2-n and mixer 3 shown in FIG. 1, and it generates synthesized tone waveform data on the basis of tone parameters input via the bus 12. Further, reference numeral 20 represents a tone waveform data memory that corresponds to the tone waveform data memory 1 of FIG. 1. The tone generator 19 includes a DSP (Digital Signal Processor), which imparts various effects, such as reverberation and chorus effects, to the synthesized tone waveform data as necessary.

The tone waveform data memory 20 may be implemented by either a dedicated ROM or a part of the above-mentioned ROM 14. In some cases, tone data may be loaded into the RAM 13 from a tone color data library contained in the external storage device 15, or may be downloaded, via the network interface 16, into the RAM 13 from a tone color data library contained in a host computer or server computer.

Reference numeral 21 represents a D/A converter (CODEC), which converts the synthesized tone waveform data, generated by the tone generator 19, into an analog waveform. Sound system 22 includes amplifiers and speakers for audibly reproducing the analog waveform signal passed from the D/A converter 21. If desired, the sound system 22 may be arranged as equipment external to the tone generation device of the present invention, and the digital output from the tone generator 19 may be passed to an external D/A converter.

The above-mentioned CPU 11 receives performance information, input via the performance operator unit 17 or external MIDI keyboard or generated by reading out a music piece data file from the external storage device 15 or network server, and processes the performance information using the RAM 13 so as to control the tone generator 19 on the basis of the processed performance information.

Where the external storage device 15 or network server is capable of recording, the performance information may be recorded therein as music piece data. Further, at least a part of the function of the tone generator 19 may be implemented by software to be run by the CPU 11.

Whereas the tone generation apparatus of the invention has been described as receiving and processing performance information generated from a keyboard-type electronic musical instrument, the performance information to be input to and processed by the tone generation apparatus may be one from a wind-type electronic musical instrument or percussion-type electronic musical instrument. Further, the tone generation apparatus may use any desired instrument tone color irrespective of from where the performance information is received.

Furthermore, the tone generation apparatus may be implemented by a dedicated electronic musical instrument such as an electronic piano. Alternatively, the tone generation apparatus may be implemented by a general-purpose computer which includes a tone generator board equipped with a tone generator and D/A converter as described above and a driver. In another alternative, the tone generation apparatus may be implemented by a general-purpose computer which includes a driver and where the CPU executes a tone-generation processing program under the control of an operating system (OS). In such a case, the tone generator 19 of FIG. 8 may be omitted, and tone waveform data are transferred from the CPU 11 via the bus. The above-mentioned tone-generation processing program is supplied from a storage media, such as a CD-ROM, or communication network, and installed into an HDD of a personal computer so that it can be executed in a similar manner to a standalone electronic musical instrument.

Figure 9:
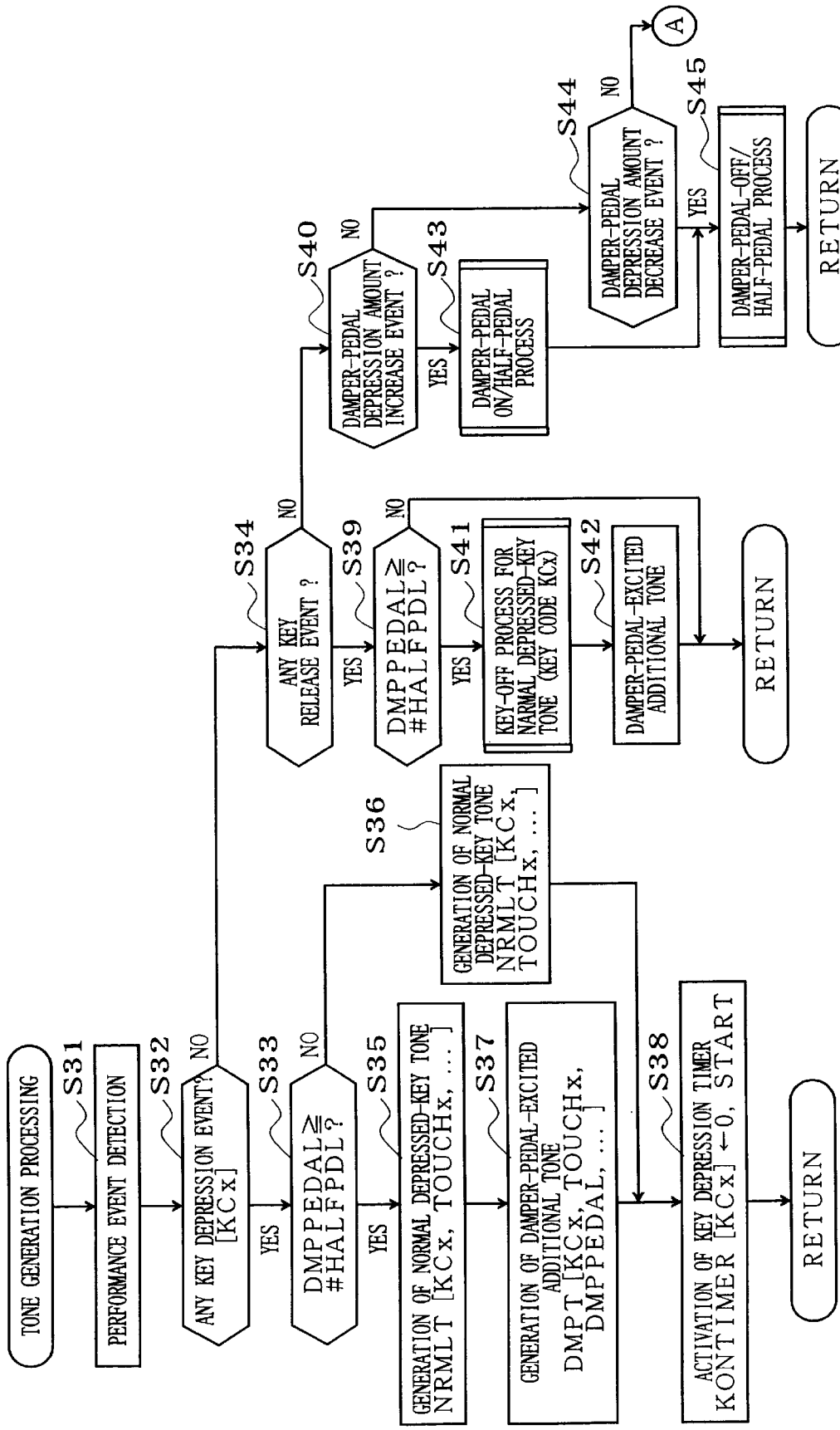
FIG. 9 is a flow chart showing a first portion of tone generation processing carried out by the tone generation apparatus.
Figure 10:
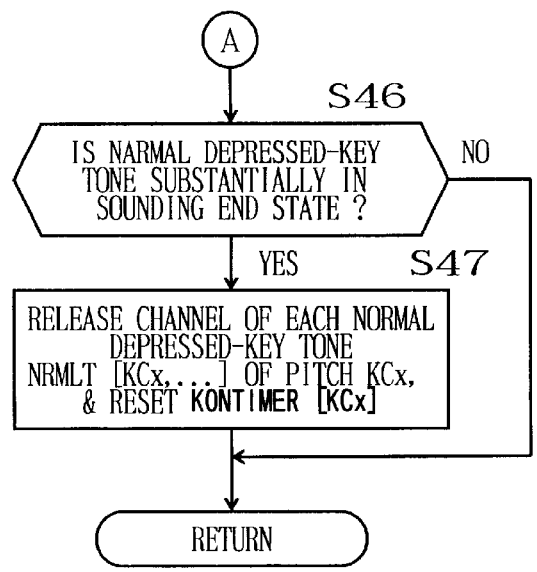
FIG. 10 is a flow chart showing a second portion of the tone generation processing carried out by the tone generation apparatus.
Figure 11:
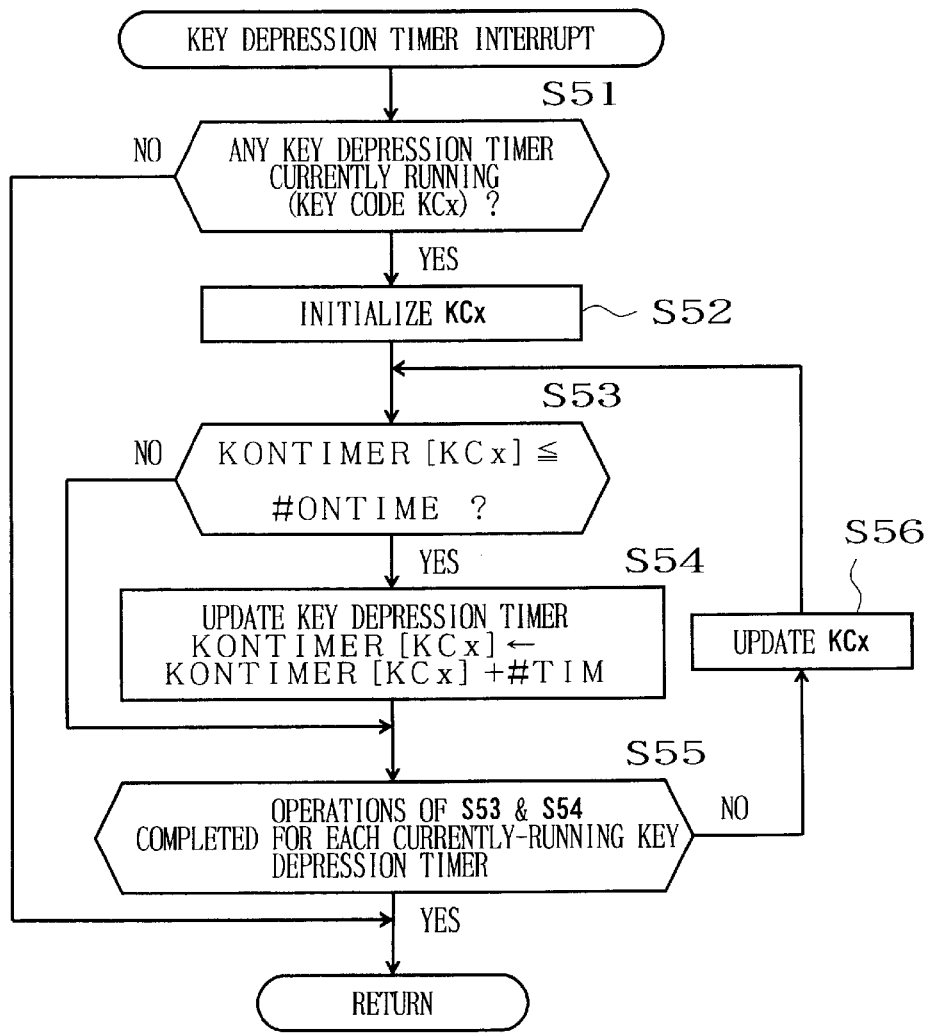
FIG. 11 is a flow chart showing a key-depression timer interrupt process carried out by the tone generation apparatus.
Figure 12:
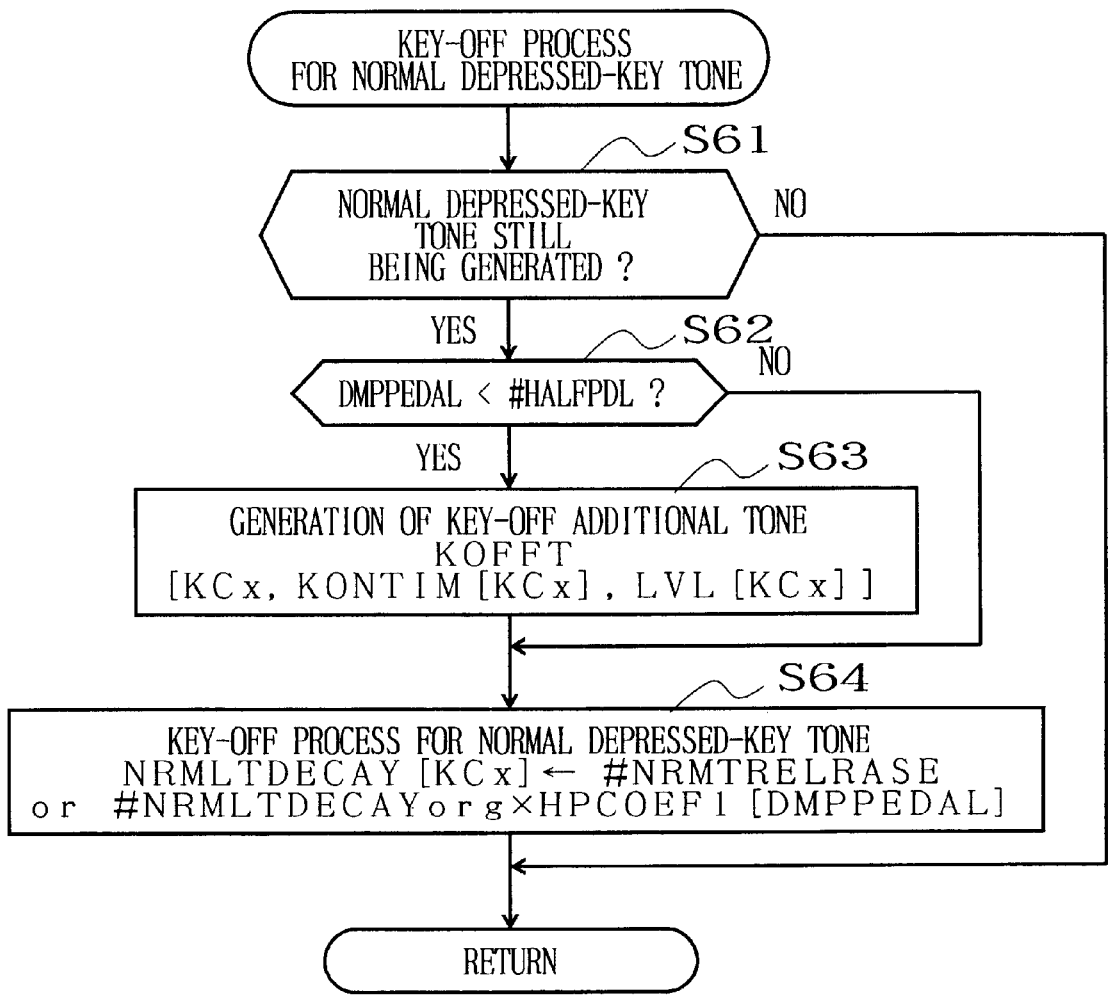
FIG. 12 is a flow chart showing a key-off process subroutine for a normal depressed-key tone carried out in the tone generation processing of FIG. 9.
Figure 13:
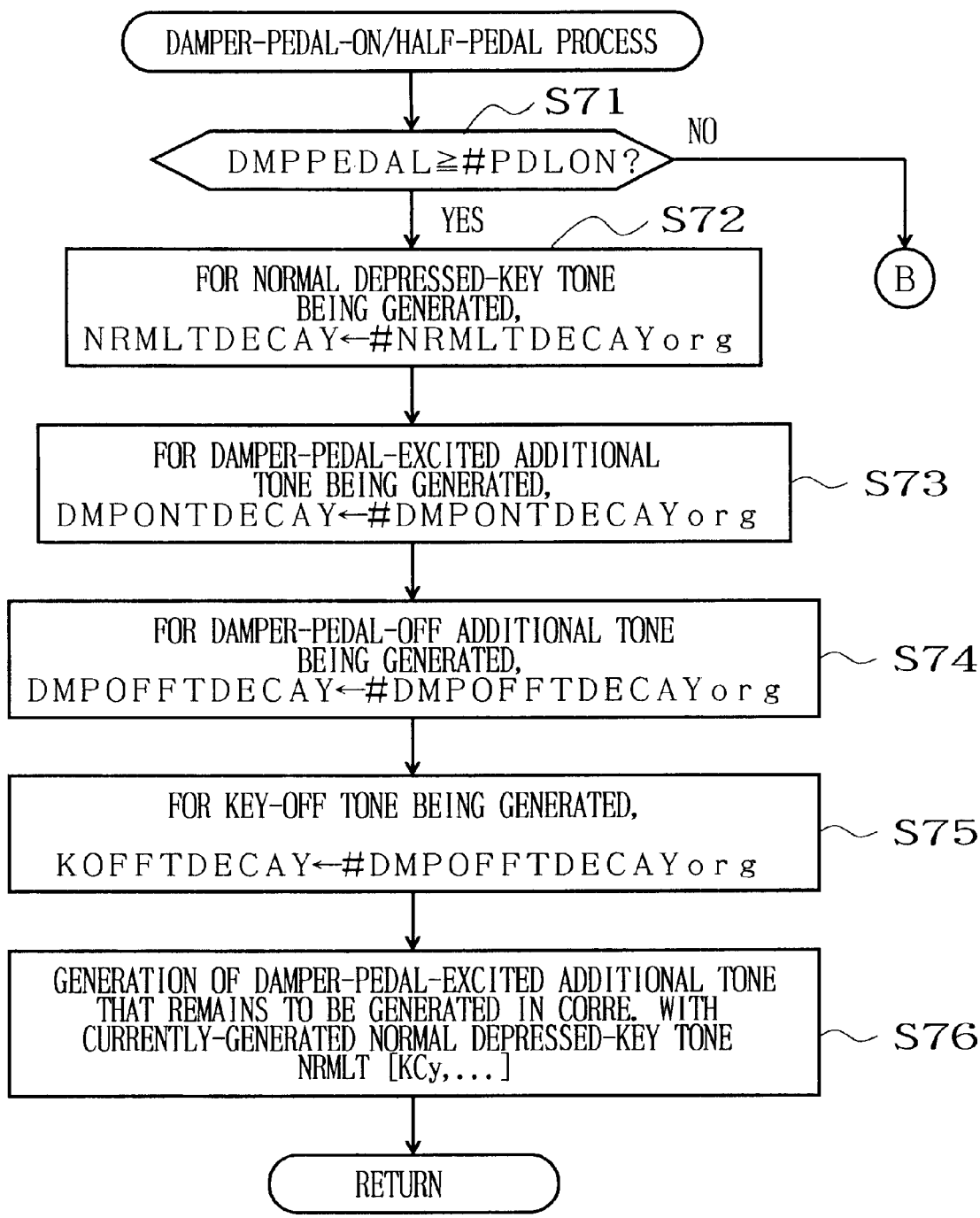
FIG. 13 is a flow chart showing a damper-pedal-on/half-pedal process subroutine carried out in the tone generation processing of FIG. 9.
Figure 14:
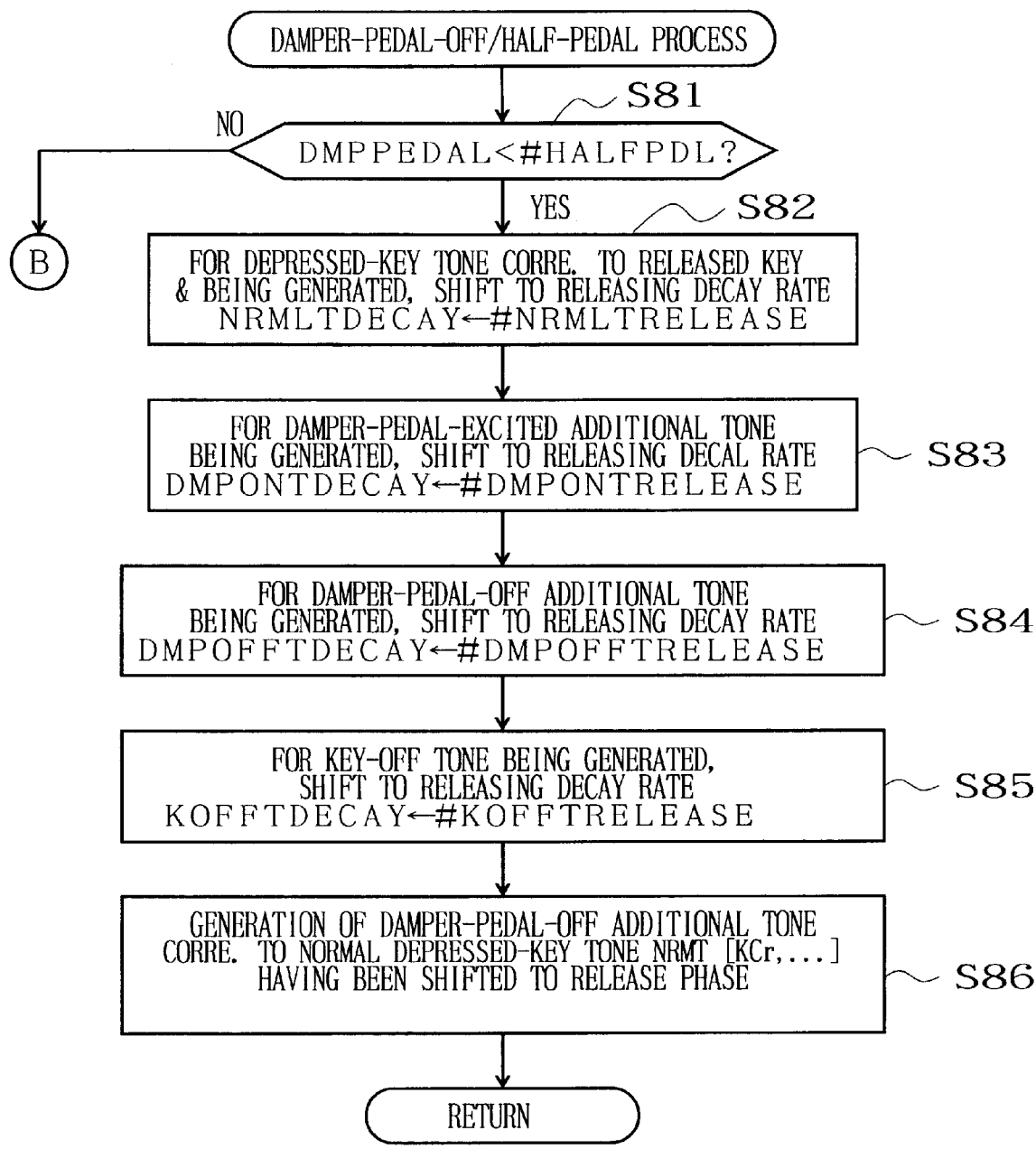
FIG. 14 is a flow chart showing a damper-pedal-off/half-pedal process subroutine carried out in the tone generation processing of FIG. 9.
Figure 15:
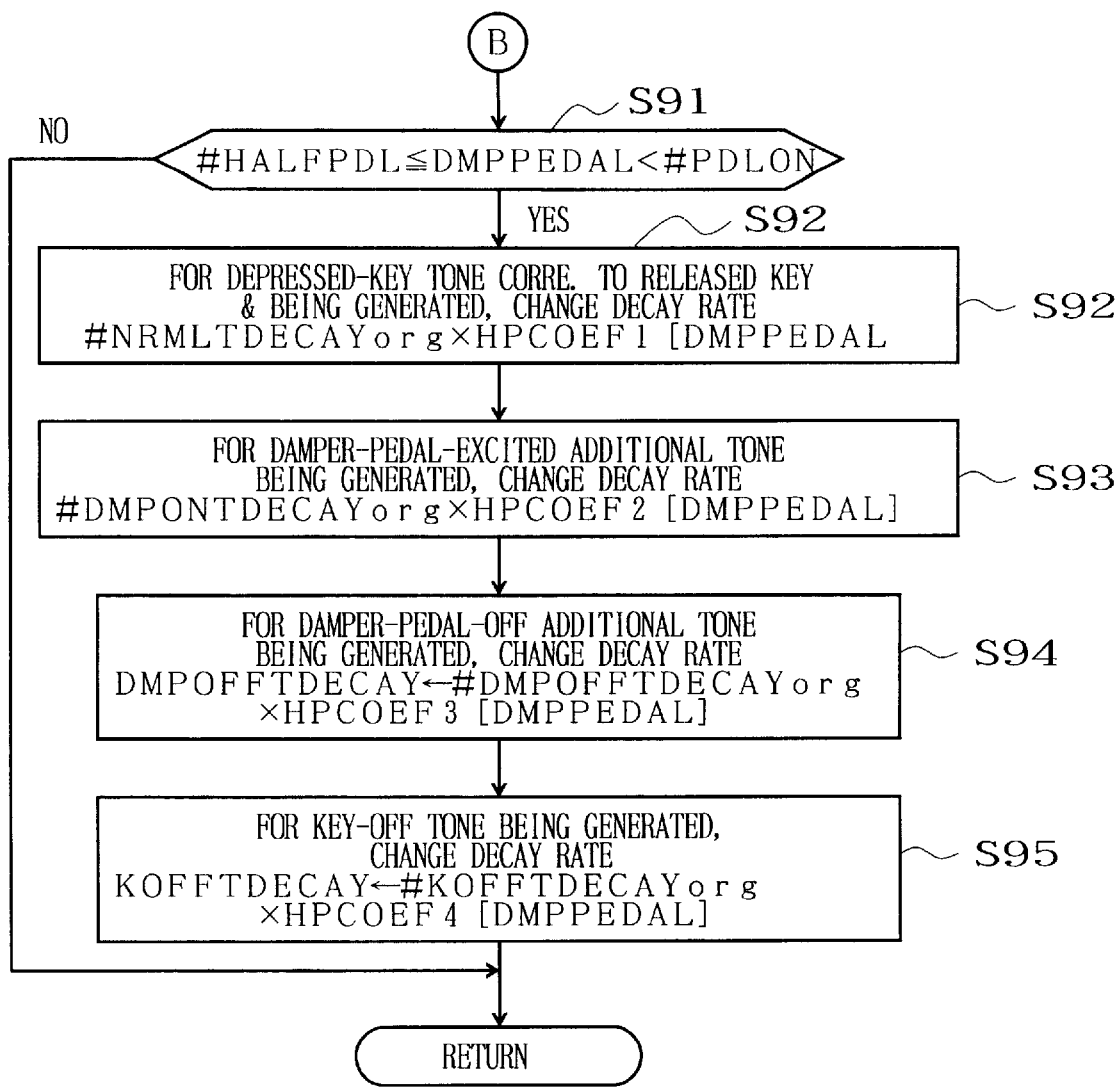
FIG. 15 is a flow chart showing a half-pedal process connected with the flow charts of FIGS. 13 and 14 through connecting point B.

FIGS. 9 to 15 are flow charts explanatory of behavior of the tone generation apparatus of the present invention. More specifically, FIGS. 9 and 10 are flow charts showing a first portion and second portion, respectively, of the tone generation processing carried out in the tone generation apparatus, and the two flow charts are connected with each other through connecting points A. FIG. 11 is a flow chart showing a key-depression timer interrupt process carried out in the tone generation apparatus, and FIG. 12 is a flow chart showing a "key-off process" subroutine for a normal depressed-key tone carried out at step S41 of FIG. 9. FIG. 13 is a flow chart showing a "damper-pedal-on/half-pedal process" subroutine carried out at step S43 of FIG. 9, and FIG. 14 is a flow chart showing a "damper-pedal-off/half-pedal process" subroutine carried out at step S45 of FIG. 9. Further, FIG. 15 is a flow chart showing a "half-pedal process" connected with the flow charts of FIGS. 13 and 14 through connecting point B.

First, the general operational flow of the tone generation processing will be outlined. Generation or sounding of a normal depressed-key tone is started in response to depression of a desired key, at step S35 or S36 of FIG. 9. The tone volume level of the normal depressed-key tone is controlled, at step S43 of FIG. 9 (or step S72 of FIG. 13 or step S92 of FIG. 15) and at step S45 of FIG. 9 (or step S92 of FIG. 15), with a decay rate corresponding to the current damper-pedal depression amount. Release control of the normal depressed-key tone is performed in response to release of the key at step S41 of FIG. 9 (or step S64 of FIG. 12). Similar release control of the normal depressed-key tone is also performed in response to release (OFF operation) of the damper pedal at step S45 of FIG. 9 (or step S82 of FIG. 14).

Generation of a damper-pedal-excited additional tone is started at step S37 of FIG. 9, provided that the damper pedal is in the depressed state at the time of the key depression. Generation of a damper-pedal-excited additional tone is also started at step S43 (or step S76 of FIG. 13) when the damper pedal is depressed after the key depression.

The tone volume level of the damper-pedal-excited additional tone is controlled, at step S43 of FIG. 9 (or step S73 of FIG. 13 or step S93 of FIG. 15) and at step S45 of FIG. 9 (or step S93 of FIG. 15), with a decay rate corresponding to the current damper-pedal depression amount. Release control of the damper-pedal-excited additional tone is performed in response to the release of the key at step S42 of FIG. 9. Similar release control of the damper-pedal-excited additional tone is also performed in response to the release (OFF operation) of the damper pedal at step S45 of FIG. 9 (or step S83 of FIG. 14).

Generation of a damper-pedal-off additional tone is started at step S45 of FIG. 9 (or step S86 of FIG. 14) when the damper pedal is released after the key release. The tone volume level of the damper-pedal-off additional tone is controlled, at step S43 of FIG. 9 (or step S74 of FIG. 13 or step S94 of FIG. 15) and at step S45 of FIG. 9 (or step S94 of FIG. 15), with a decay rate corresponding to the current damper-pedal depression amount. Release control of the damper-pedal-off additional tone is performed at step S45 of FIG. 9 (step S84 of FIG. 14).

Further, generation of a key-off additional tone is started at step S41 of FIG. 9 (or step S63 of FIG. 12), provided that the key is released while the damper pedal is in the released (OFF) state. The tone volume level of the key-off additional tone is controlled, at step S43 of FIG. 9 (or step S75 of FIG. 13 or step S95 of FIG. 15) and at step S45 of FIG. 9 (or step S95 of FIG. 15), with a decay rate corresponding to the current damper-pedal depression amount. Release control of the key-off additional tone is performed at step S45 of FIG. 9 (step S85 of FIG. 14).

The tone generating channel for the normal depressed-key tone (i.e., main tone component corresponding to the depressed key) is released or disengaged at step S47 of FIG. 10. Although not specifically shown, the tone generating channels for the damper-pedal-excited additional tone, damper-pedal-off additional tone and key-off additional tone may be released or disengaged at step S47 of FIG. 10 simultaneously with the release of the channel for the normal depressed-key tone, or may be released in the process of FIG. 10 by setting a predetermined release condition for each of the tone components.

The above-outlined tone generation processing contains, here and there, operation steps that use a tone-generation lasting time of a normal depressed-key tone. Such a tone-generation lasting time of the normal depressed-key tone is caused to start advancing at step S38 of FIG. 9 and counted by the timer interrupt process of FIG. 11.

First, the tone generation processing performed by the inventive tone generation apparatus will be described with reference to FIG. 9. Let's assume here that this tone generation processing is carried out repetitively at short time intervals as one task. For example, the tone generation processing is carried out as a subroutine repeatedly executed in a main processing routine of the program or as processing invoked in response to a timer interrupt signal.

At step S31, a performance event detection process is executed. If there has occurred a key depression event of a certain key (KCx) as determined at step S32, the processing proceeds to step S33; otherwise, the processing branches to step S34. At step S33, a determination is made as to whether or not the current damper-pedal depression amount (DMPPEDAL) is equal to or greater than a half-pedal threshold value (#HALFPDL). With an affirmative answer at step S33, the processing goes on to step S35, but with a negative answer, the processing branches to step S36.

At step S35, one of the tone generating channels is assigned to the normal depressed-key tone (NRMLT) of key code KCx and generation of the normal depressed-key tone is initiated, after which the processing goes to step S37. Tone waveform of the normal depressed-key tone is selected in accordance with the key code (KCx), key touch (TOUCHx), etc. Tone volume level, at the beginning of sounding, of the normal depressed-key tone is controlled in accordance with the key code (KCx), key touch (TOUCHx), damper-pedal depression amount (DMPPEDAL), etc. Operation similar to that of step S35 is carried out at step S36, which is however followed by step S38 with step S37 skipped.

At step S37, another one of the tone generating channels is assigned to a damper-pedal-excited additional tone (DMPT) that is to be generated provided that the damper pedal is in the depressed state at the beginning of the generation of the normal depressed-key tone (NRMLT) of key code KCx, and generation of the damper-pedal-excited additional tone (DMPT), after which the processing goes to step S38. Tone waveform of the damper-pedal-excited additional tone is selected in accordance with the key code (KCx), key touch (TOUCHx), etc. Tone volume level, at the beginning of sounding, of the damper-pedal-excited additional tone is controlled in accordance with the key code (KCx), key touch (TOUCHx), damper-pedal depression amount (DMPPEDAL), etc.

At step S38, the key depression timer corresponding to the key of key code KCx is activated. Namely, the key depression timer is started to run after the key depression timer time (KONTIMER) for the key is set to an initial value of "0", and then the tone generation processing returns to the not-shown main processing routine. Specifically, this key depression timer is caused to count a changing tone-generation lasting time of the normal depressed-key tone by the key depression timer interrupt process of FIG. 11.

If there has occurred no key depression event as determined at step S32, the processing branches to step S34, where it is determined whether or not there has occurred a key release event of a certain key (KCx). With an affirmative answer at step S34, the processing goes to step S39; otherwise, the processing further branches to step S40.

At step S39, a determination is made as to whether or not the current damper-pedal depression amount (DMPPEDAL) is smaller than a damper-pedal-on threshold value (#PDLON). With an affirmative answer at step S39, the processing goes on to step S41. But, if the current damper-pedal depression amount (DMPPEDAL) is equal to or greater than the damper-pedal-on threshold value (#PDLON), this meas that the current damper-pedal depression amount is in the damper-pedal-on region, so that the processing returns to the not-shown main processing routine with the key-off process of steps S41 and S42 skipped irrespective of the occurrence of the key release event.

At step S41, the key-off process is performed on the normal depressed-key tone of key code KCx along with a process for generating the key-off additional tone related to the normal depressed-key tone, as will be detailed below with reference to FIG. 12. At step S61 of FIG. 12, a determination is made as to whether the normal depressed-key tone of key code KCx is still being generated. If answered in the affirmative, the processing moves on to step S62, but if not, the processing returns to the not-shown main processing routine. Note that an affirmative determination is made at step S62 when the tone volume level of the normal depressed-key tone of key code KCx (NRMLTLEVEL [KCx]) is greater than a predetermined threshold level (#LVL) or when the tone-generation lasting time of the normal depressed-key tone of key code KCx (KONTIM [KCx]) is equal to or smaller than a predetermined threshold time value (#ONTIME).

At step S62, a determination is made as to whether or not the current damper-pedal depression amount (DMPPEDAL) is smaller than the half-pedal threshold value (#HALFPDL). With an affirmative answer at step S62, the processing proceeds to the process for generating a key-off additional tone (KOFFT) at step S63 assuming that the current damper-pedal depression amount is in the damper-pedal-off region. If, on the other hand, the current damper-pedal depression amount (DMPPEDAL) is not smaller than the half-pedal threshold value (#HALFPDL), the processing jumps to step S64 without performing the key-off additional tone generating process of step S63.

At step S63, one of the tone generating channels is assigned to the key-off additional tone (KOFFT) of key code KCx, and generation of the key-off additional tone is initiated. Tone waveform of the key-off additional tone is selected on the basis of the key code (KCx) etc. Tone volume level, at the beginning of sounding, of the key-off additional tone is controlled in accordance with the key code (KCx), current tone-generation lasting time and/or current tone volume level (LVL[KCx]) of the corresponding normal depressed-key tone (KONTIM[KCx]), etc.

At step S64, the key-off process is performed on the the normal depressed-key tone (NRMLT) of the released key (KCx). Namely, the decay rate (NRMLTDECAY) of the normal depressed-key tone is set to a value corresponding to the current damper-pedal depression amount (DMPPEDAL) in accordance with the relationship shown in FIG. 2. Specifically, the decay rate is set to the maximum value "#NRMTRELEASE" when the current damper-pedal depression amount is in the damper-pedal-off region, but set to a value "#NRMLTDECAYorg×HPCOEF1 [DMPPEDAL]" when the current damper-pedal depression amount is in the half-pedal region.

Referring back to FIG. 9, in the key-off process, which is performed at step S42 for the damper-pedal-excited additional tone related to the normal depressed-key tone corresponding to the released key (KCx), the tone volume level of the damper-pedal-excited additional tone is caused to decline at a decay rate corresponding to the key code (KCx), damper-pedal depression amount (DMPPEDAL), etc. After that, the processing returns to the not-shown main processing routine. Note that in the damper-pedal-on state, step S42 is skipped so as not to perform the key-off process on the damper-pedal-excited additional tone. To the relationship between the current damper-pedal depression amount (DMPPEDAL) and the decay rate of the damper-pedal-excited additional tone, there are applied characteristics similar to those of the normal depressed-key tone shown in FIG. 2. Namely, the decay rate of the damper-pedal-excited additional tone is set to a maximum value "#DMPONTRELEASE" when the current damper-pedal depression amount is in the damper-pedal-off region, but when the current damper-pedal depression amount is in the half-pedal region, it is set to a value "#DMPONTDECAYorg×HPCOEF2 [DMPPEDAL]" so as to decrease as the damper-pedal depression amount (DMPPEDAL) becomes greater.

Note that when the decay rate of the damper-pedal-excited additional tone corresponding to the key release is to be made different from the decay rate of the damper-pedal-excited additional tone applied during the key depression, it is only necessary that the above-mentioned coefficients "#DMPONTRELEASE", "#DMPONTDECAYorg" and "HPCOEF2[DMPPEDAL]" be differentiated from the corresponding coefficients of the damper-pedal-excited additional tone applied during the key depression and that such coefficients continue to be used for calculation of the decay rate of the damper-pedal-excited additional tone at other steps until the release of the damper-pedal-excited additional tone is completed.

The following paragraphs describe operations at and after step S40 which are to be carried out when no key release event has been detected at step S34.

If there has occurred a damper-pedal depression amount increase event as determined at step S40, the processing proceeds to step S43, where the damper-pedal-on/half-pedal process is carried out as flowcharted in more detail in FIG. 13. If, on the other hand, no damper-pedal depression amount increase event has occurred as determined at step S40, the processing goes to step S44, where it is determined whether there has occurred a damper-pedal depression amount decrease event. With an affirmative determination at step S44, the processing proceeds to step S45 in order to carry out the damper-pedal-off/half-pedal process as flowcharted in more detail in FIG. 14. If no damper-pedal depression amount decrease event has occurred as determined at step S44, then other operations are performed as shown in FIG. 10.

At step S71 of FIG. 13, a determination is made as to whether the current damper-pedal depression amount (DMPPEDAL) is equal to or greater than the damper-pedal-on threshold value (#PDLON), i.e., whether the current damper-pedal depression amount (DMPPEDAL) is in the damper-pedal-on region. With an affirmative answer at step S71, the processing goes on to step S72, but with a negative answer, the processing branches to the process of FIG. 15. At step S72 of FIG. 13, the decay rate of the normal depressed-key tone being currently generated is set to a predetermined value "#NRMLTDECAYPorg" corresponding to a freely vibrating state of the associated string set.

At step S73, the decay rate of the damper-pedal-excited additional tone being currently generated is set to a predetermined value "#DMPONDECAYorg" corresponding to a freely vibrating state of the associated string set. At step S74, the decay rate of the damper-pedal-off additional tone being currently generated is set to a predetermined value "#DMPOFFDECAYorg" corresponding to a freely vibrating state of the associated string set. At step S75, the decay rate of the key-off additional tone being currently generated is set to a predetermined value "#KOFFDECAYorg" corresponding to a freely vibrating state of the associated string set.

Note that because the damper-pedal-excited additional tone and key-off additional tone each have a small tone volume level and short tone-generation lasting time or duration, the decay rates of these additional tones may each be fixed at a predetermined value irrespective of the current damper-pedal depression amount (DMPPEDAL).

At step S76, generation of a damper-pedal-excited additional tone, which remains to be generated in correspondence with any currently-generated normal depressed-key tone (NRMLT[KCy, ... ]), is started, and then the processing returns to the not-shown main processing routine. Namely, in case at least one currently-generated normal depressed-key tone designated with a given key code KCy is still being generated and the damper-pedal-excited additional tone corresponding to the depressed key (KCy) has not yet been generated, that damper-pedal-excited additional tone is caused to start sounding. Note that the "key code KCy" here means the key code of each individual key for which the normal depressed-key tone is being generated, and each damper-pedal-excited additional tone corresponding to the normal depressed-key tone is generated through the tone generating channel assigned separately to that tone component of the key code (KC1).

Tone waveform of the damper-pedal-excited additional tone is selected in accordance with the key code (KCy), key touch (TOUCH[KCy]), etc. of the corresponding currently-generated normal depressed-key tone (NRMLT[KCy, ... ]). Tone volume level, at the beginning of sounding, of the damper-pedal-excited additional tone is controlled in accordance with the key code (KCv), key touch (TOUCHy), tone-generating state—the counted time value of the key depression timer (KONTIMER[KCy] and/or current tone volume level (LVL[KCy])—, current damper-pedal depression amount (DMPPEDAL), etc. of the normal depressed-key tone (NRMLT[KCy]). For example, the tone volume level, at the beginning of sounding, of the damper-pedal-excited additional tone is set, through a lookup table or arithmetic operation, to decrease as the counted time value of the key depression timer (KONTIMER[KCy]) becomes greater.

Note that where the number of the assignable tone generating channels is limited, channel assignment priority is given to such a damper-pedal-excited additional tone corresponding a normal depressed-key tone which is greater in the counted time value of the key depression timer (KONTIMER[KCy]) and/or current tone volume.

If it has been determined at step S71 that the current damper-pedal depression amount (DMPPEDAL) is smaller than the damper-pedal-on threshold value (#PDLON), i.e. that the current damper-pedal depression amount (DMPPEDAL) is in the damper-pedal-off or half-pedal region, the processing proceeds to the process of FIG. 15.

If the current damper-pedal depression amount (DMPPEDAL) is equal to or greater than the half-pedal threshold value (#HALFPDL) but smaller than the damper-pedal-on threshold value (#PDLON), i.e. if the current damper-pedal depression amount (DMPPEDAL) is in the half-pedal region, as determined at step S91 of FIG. 15, then the processing moves on to step S92. If, on the other hand, the current damper-pedal depression amount (DMPPEDAL) is not in the half-pedal region, the processing returns to the not-shown main processing routine, by way of the routine of FIG. 9, without performing the operation of step S92. Therefore, in response to the damper-pedal depression amount increase event, no particular operation is performed as long as the current damper-pedal depression amount (DMPPEDAL) is in the damper-pedal-off region.

At steps S92 to S95, the decay rates of the individual tone components of one or more key codes meeting predetermined conditions are varied in accordance with the current damper-pedal depression amount, after which the processing reverts to step S45 of FIG. 9. Namely, at step S92, on condition that the normal depressed-key tone concerns a key currently in the released state and is still being generated or sounded, the decay rate of the normal depressed-key tone (NRMLTDECAY) is set to a value obtained by multiplying a predetermined damper-pedal-off-state decay value (#NRMLTDECAYorg) by a coefficient "HPCOEF1 [DMPPEDAL]" that is a function of the damper-pedal depression amount (DMPPEDAL). These predetermined damper-pedal-off-state decay value and coefficient are made to differ, for example, depending on the key code of the normal depressed-key tone.

At step S93, on condition that the damper-pedal-exited additional tone is still being generated, the decay rate of the damper-pedal-exited additional tone (DMPONTDECAY) is set to a value obtained by multiplying a predetermined damper-pedal-off-state decay value (#DMPONTDECAYorg) by a coefficient "HPCOEF2 [DMPPEDAL]" that is also a function of the damper-pedal depression amount (DMPPEDAL). These predetermined damper-pedal-off-state decay value and coefficient are made to differ, for example, depending on the key code of the normal depressed-key tone acting as an excitation energy source of the damper-pedal-exited additional tone.

At step S94, on condition that the damper-pedal-off additional tone is still being generated, the decay rate of the damper-pedal-off additional tone (DMPOFFTDECAY) is set to a value obtained by multiplying a predetermined damper-pedal-off-state decay value (#DMPOFFTDECAYorg) by a coefficient "HPCOEF3 [DMPPEDAL]" that is also a function of the damper-pedal depression amount (DMPPEDAL). These predetermined damper-pedal-off-state decay value and coefficient are made to differ, for example, depending on the key code of the normal depressed-key tone prevented by the damper from vibrating.

At step S95, on condition that the key-off additional tone is still being generated, the decay rate of the damper-pedal-off additional tone (KOFFTDECAY) is set to a value obtained by multiplying a predetermined damper-pedal-off-state decay value (#KOFFTDECAYorg) by a coefficient "HPCOEF4[DMPPEDAL]" that is also a function of the damper-pedal depression amount (DMPPEDAL). These predetermined damper-pedal-off-state decay value and coefficient are made to differ, for example, depending on the key code of the normal depressed-key tone subjected to the key-off operation.

Note that because the damper-pedal-off additional tone and key-off additional tone each have a small tone volume level and short tone-generation lasting time or duration, the decay rates of these additional tones may each be fixed at a corresponding predetermined value irrespective of the damper-pedal depression amount (DMPPEDAL), as previously noted.

The following paragraphs describe the damper-pedal-off process shown in FIG. 14. At step S81, a determination is made as to whether the current damper-pedal depression amount (DMPPEDAL) is smaller than the half-pedal threshold value (#HALFPDL), i.e., whether the current damper-pedal depression amount (DMPPEDAL) is in the damper-pedal-off region. With an affirmative answer at step S81, the processing goes on to step S82, but with a negative answer (i.e., if the current damper-pedal depression amount (DMPPEDAL) is in the half-pedal region as determined at step S81), the processing branches to the process of FIG. 15.

At steps S82 to S85, the decay rates of the individual tone components of one or more key codes meeting predetermined conditions are shifted to a release process for effecting rapid volume level decay, after which the processing reverts to the not-shown main processing routine by way of the routine of FIG. 9. Namely, at step S82, on condition that the normal depressed-key tone corresponds to a key currently in the released state and is still being generated or sounded, the decay rate of the normal depressed-key tone (NRMLTDECAY) is set to a predetermined releasing decay rate (#NRMLTRELEASE).

At step S83, on condition that the damper-pedal-excited additional tone is still being generated, the decay rate of the damper-pedal-excited additional tone (DMPONTDECAY) is set to a predetermined releasing decay rate (#DMPONTRELEASE). At step S84, on condition that the damper-pedal-off additional tone is still being generated, the decay rate of the damper-pedal-off additional tone (DMPOFFDECAY) is set to a predetermined releasing decay rate (#DMPOFFTRELEASE). At step S85, on condition that the key-off additional tone is still being generated, the decay rate of the key-off additional tone (KOFFTDECAY) is set to a predetermined releasing decay rate (#KOFFTRELEASE).

Further, at following step S86, one of the tone generating channels is assigned to the damper-pedal-off additional tone corresponding to the normal depressed-key tone NRMT [KCr, . . . ] having been shifted to the release phase by the release of the damper pedal, so as to start generation of the damper-pedal-off additional tone. After that, the processing returns to the not-shown main processing routine by way of the routine of FIG. 9.

Tone waveform shape of the damper-pedal-off additional tone is selected, for example, on the basis of the key code (KCr). Tone volume level, at the beginning of sounding, of the damper-pedal-off additional tone is controlled in accordance with the key code (KCr), tone-generating state—the counted time value of the key depression timer (KONTM [KCr] and/or current tone volume level (LVL[KCr])—, etc. of the corresponding normal depressed-key tone.

If the current damper-pedal depression amount (DMPPEDAL) is equal to or greater than the half-pedal threshold value (#HALFPDL) as determined at step S81 of FIG. 14, then the processing goes on to the process of FIG. 15. The process of FIG. 15 is also invoked from step S71 of FIG. 13 as previously described. Therefore, as long as the damper-pedal depression amount is in the half-pedal region, exactly the same operations as described above are carried out. Because, in this case, the process of FIG. 15 has been invoked from step S44 of FIG. 9, no particular operation is performed in response to the damper-pedal depression amount decrease event while the current damper-pedal depression amount is in the damper-pedal-on region.

Then, if no damper-pedal depression amount decrease event has occurred as determined at step S44, the processing moves on to the process of FIG. 10. At step S46 of FIG. 10, a determination is made as to whether one or more normal depressed-key tones of key code KCx are substantially in a tone-generation or sounding completed state. Namely, it is ascertained whether the current tone volume levels of these normal depressed-key tones (NRMTLEVEL[KCx]) are smaller than a predetermined threshold level (#LVL) and greater than a tone-generation lasting time (KONTIMER [KCx]). If such conditions are met, then the processing goes to step S47, but if not, the processing returns to the not-shown main processing routine without performing the operation of step S47. At step S47, the tone generating channel of each of the normal depressed-key tones (NRMTLT[KCx, . . . ]) meeting the condition of step S46 is released or disengaged. Further, the tone-generation lasting time (KONTIMER[KCx] of the normal depressed-key tone is reset to a "0" value.

Finally, the key depression timer interrupt process will be described with reference to FIG. 11. At step S51, a determination is made as to whether at least one of the key depression timers for counting the tone-generation lasting time is currently running. If answered in the affirmative at step S51, the processing proceeds to step S5, but if answered in the negative, the key depression timer interrupt process is brought to and end without performing any other operation.

At step S52, the value of the key code (KCx) is initialized to the key code of one of the one or more currently-running key depression timers, after which the processing moves on to step S53. At step S53, a determination is made as to whether the value of the tone-generation lasting time (KONTIMER[KCx]) is equal to or smaller than a maximum count value of the key depression timer (#ONTIME). If the value of the tone-generation lasting time (KONTIMER [KCx]) is equal to or smaller than the maximum count value (#ONTIME), the processing goes to step S54, but if the value of the tone-generation lasting time (KONTIMER [KCx]) is greater than the maximum count value (#ONTIME), then the processing jumps over step S54 to step S55.

The above-mentioned maximum count value of the key depression timer (#ONTIME) is set in order to save the storage capacity of a buffer to be used for storing a changing counted value of the tone-generation lasting time and reduce the processing loads of the apparatus. This maximum count value (#ONTIME) may be set to differ depending the tone pitch or key range. In the case of the piano tone, for example, the maximum count value (#ONTIME) may be set to decrease as the tone pitch becomes higher, because piano tones of higher pitches have shorter tone-generation lasting time.

At step S54, the value of the tone-generation lasting time (KONTIMER[KCx]) is updated. Namely, if the key depression timer interrupt is set to occur at time intervals of "#TIM", the value #TIM is added to the current value of the tone-generation lasting time (KONTIMER[KCx]) to thereby update the value of the tone-generation lasting time (KONTIMER[KCx]), after which the processing moves on to step S55. At step S55, a determination is made, for all of the currently-running key depression timers, as to whether the operations of steps S53 and S54 have been completed. If answered in the affirmative, the key depression timer interrupt process of FIG. 11 is brought to an end. If, however, the operations of steps S53 and S54 have not yet been completed for all of the currently-running key depression timers as determined at step S55, the processing branches to step S56, where the value of the key code KCx is updated with the key code of the key depression timer for which the operations of steps S53 and S54 have not been completed yet, so that the operations of steps S53 and S54 are performed on that key depression timer.

Whereas the present invention has been described above as modeling the sounding mechanism of an acoustic piano, it may be arranged to generate tones not existing in the natural world by dealing with any other tone colors than the piano tone colors, such as tone colors of wind instruments or rubbed string instruments.

Further, the decay rate values of the individual tone components, volume level of the damper-pedal-excited additional tones, and volume levels and tone-generation lasting time of the damper-pedal-off tones and key-off tones may also be set uniquely as desired by the user without being constrained to the characteristics of natural musical instruments.

Furthermore, the damper-pedal-excited additional tones may be made different from the resonant tones of the corresponding normal depressed-key tones so that tones different from those generated by the sounding mechanisms of natural musical instruments can be provided by the present invention. In addition, the damper-pedal-off tones and key-off tones too may be made different from vibration-suppressed tones of natural musical instruments.

Furthermore, although the present invention has been described above primarily in relation to the damper pedal operating in the continuous operation mode, the basic principles of the present invention can also be applied when the damper pedal is operating in the switching operation mode. In such a case, it is only necessary that the damper pedal be identified as being in the OFF state when its depression amount is below a predetermined value and identified as being in the ON state when the depression amount is not below the predetermined value and that different decay rate values be allocated to the OFF and ON states.

The tone waveform data of each of the above-mentioned tone components may be those obtained by sampling and recording an entire waveform, from the attack to decay, of a natural or acoustic musical instrument, or those obtained by further processing thus-recorded entire waveform. In an alternative, the attack portion of the tone component may be reproduced using tone waveform data sampled and recorded in the above-mentioned manner, and the envelope of the first and subsequent decay portions of the tone component may be controlled to decay while sustain tone waveform data are repetitively used in a looped fashion for reproduction of the decay portions.

The tone generator used in the present invention may be other than the one using a tone waveform memory as described above, such as an FM tone generator, physical model tone generator or the like; in this case too, the FM tone generator, physical model tone generator or the like creates tone waveform data of normal depressed-key tones (or main tone components) and additional tones, such as damper-pedal-excited additional tones, key-off tones and damper-pedal-off tones, and control the respective tone volume levels and decay rates of these tone components, in the above-described manner.

It should further be appreciated that the present invention can be applied to electronic musical instruments, sound-generating-type amusement equipment such as game equipment and karaoke apparatus, various types of sound-generating-type household electrical appliances such as TV sets, sound-generating-type portable terminal equipment such as cellular phones and personal information management (PIM) devices. The present invention is also applicable to general-purpose computer apparatus and computer systems.

In summary, as apparent from the foregoing, the present invention can dynamically control generation and characteristics of an additional tone, such as a resonant tone, on the basis of timing of key depression, operation timing of an auxiliary performance operator and an operated amount of the auxiliary performance operator. Particularly, the present invention can electronically attain a tone faithfully approximating an acoustic piano tone, by simulating tone components, such as a resonant tone component excited by manipulation of the damper pedal and vibration-suppressed tone component produced by release of the damper pedal.

What is claimed is:

1. A tone generation apparatus comprising:
   a performance operation device adapted to instruct generation of a tone;
   an auxiliary performance operator having at least two operation states: an ON operation state; and an OFF operation state; and
   a processor device coupled with said performance operation device and said auxiliary performance operator, said processor device being adapted to:
   generate a normal tone in accordance with an instruction given by said performance operation device; and
   generate, when said auxiliary performance operator is operated while the normal tone is being generated, at least first and second additional tones that correspond to the ON operation state and the OFF operation state of said auxiliary performance operator and are related to the normal tone being generated.

2. A tone generation apparatus as claimed in claim 1 wherein said processor device is further adapted to determine a tone volume level, at the beginning of generation, of the additional tone in accordance with an elapsed time from the beginning of generation of the normal tone to the beginning of generation of the additional tone.

3. A tone generation apparatus as claimed in claim 1 wherein said processor device is further adapted to determine a volume level, at the beginning of generation, of the additional tone, in accordance with a tone volume level of the normal tone at beginning of generation of the additional tone.

4. A tone generation apparatus as claimed in claim 1 wherein said auxiliary performance operator is capable of generating information indicative of an operated amount thereof including an intermediate operation value between the ON operation state and the OFF operation state, and wherein said processor device is further adapted to control at least one of decay rates of the normal tone and the additional tone in accordance with the information indicative of the operated amount generated by said auxiliary performance operator.

5. A tone generation apparatus as claimed in claim 1 wherein said performance operation device is a keyboard including a plurality of keys for designating a desired pitch of a tone, and said auxiliary performance operator is a pedal.

6. A tone generation apparatus as claimed in claim 1 wherein said second additional tone corresponding to said OFF operation state is a returning tone related to the normal tone being generated, provided that the normal tone is being generated when said auxiliary performance operator has returned from the ON operation state to the OFF operation state.

7. A tone generation apparatus as claimed in claim 1 wherein said second additional tone corresponding to said OFF operation state is a key-off tone related to the normal tone being generated, provided that an instruction for terminating generation of the normal tone is given by said performance operation device while said auxiliary performance operator is in the OFF operation state.

8. A tone generation apparatus as claimed in claim 1 wherein said first additional tone corresponding to said ON operation state is a resonant tone corresponding to a pitch of the normal tone.

9. A tone generation apparatus as claimed in claim 6 wherein said first additional tone corresponding to said ON operation state is a resonant tone occurring as a tone corresponding to a pitch of the normal tone is generated on an acoustic keyboard instrument, and wherein the returning tone is a vibration-suppressed tone occurring as a mechanical vibration producing the resonant tone is ceased on the acoustic keyboard instrument.

10. A tone generation apparatus comprising:

a performance operation device adapted to instruct generation of a tone;

an auxiliary performance operator having at least two operation states: an ON operation state; and an OFF operation state; and a processor device coupled with said performance operation device and said auxiliary performance operator, said processor device being adapted to:

generate a normal tone in accordance with an instruction given by said performance operation device; and start, when said auxiliary performance operator is changed from the ON operation state to the OFF operation state while the normal tone is being generated, generation of an additional tone that is related to the normal tone being generated.

11. A tone generation apparatus as claimed in claim 10 wherein the additional tone related to the normal tone is a tone approximating a vibration-suppressed tone occurring as a mechanical vibration producing a resonant tone is ceased on an acoustic instrument.

12. A tone generation method for instructing generation of a tone in response to manipulation of a performance operation device and controlling the tone in response to manipulation of an auxiliary performance operator, said auxiliary performance operator having at least two operation states: an ON operation state; and an OFF operation state, said tone generation method comprising the steps of:

generating a normal tone in accordance with an instruction given by said performance operation device; and generating, when said auxiliary performance operator is operated while the normal tone is being generated, at least first and second additional tones that correspond to the ON operation state and the OFF operation state of said auxiliary performance operator and are related to the normal tone being generated.

13. A tone generation method as claimed in claim 12 wherein said second additional tone corresponding to said OFF operation state is a returning tone related to the normal tone being generated, provided that the normal tone is being generated when said auxiliary performance operator has returned from the ON operation state to the OFF operation state.

14. A tone generation method as claimed in claim 12 wherein said second additional tone corresponding to said OFF operation state is a key-off tone related to the normal tone being generated, provided that an instruction for terminating generation of the normal tone is given by said performance operation device while said auxiliary performance operator is in the OFF operation state.

15. A tone generation method for instructing generation of a tone in response to manipulation of a performance operation device and controlling the tone in response to manipulation of an auxiliary performance operator, said auxiliary performance operator having at least two operation states: an ON operation state; and an OFF operation state, said tone generation method comprising the steps of:

generating a normal tone in accordance with an instruction given by said performance operation device; and starting, when said auxiliary performance operator is changed from the ON operation state to the OFF operation state while the normal tone is being generated, generation of an additional tone that is related to the normal tone being generated.

16. A machine-readable storage medium containing a group of instructions to cause said machine to implement a tone generation method for instructing generation of a tone in response to manipulation of a performance operation device and controlling the tone in response to manipulation of an auxiliary performance operator, said auxiliary performance operator having at least two operation states: an ON operation state; and an OFF operation state, said tone generation method comprising the steps of:

generating a normal tone in accordance with an instruction given by said performance operation device; and generating, when said auxiliary performance operator is operated while the normal tone is being generated, at least first and second additional tones that correspond to the ON operation state and the OFF operation state and are related to the normal tone being generated.

17. A machine-readable storage medium as claimed in claim 16 wherein said second additional tone corresponding to said OFF operation state is a returning tone related to the normal tone being generated, provided that the normal tone is being generated when said auxiliary performance operator has returned from the ON operation state to the OFF operation state.

18. A machine-readable storage medium as claimed in claim 16 wherein said second additional tone corresponding to said OFF operation state is a key-off tone related to the normal tone being generated, provided that an instruction for terminating generation of the normal tone is given by said performance operation device while said auxiliary performance operator is in the OFF operation state.

19. A machine-readable storage medium containing a group of instructions to cause said machine to implement a tone generation method for instructing generation of a tone in response to manipulation of a performance operation device and controlling the tone in response to manipulation of an auxiliary performance operator, said auxiliary performance operator having at least two operation states: an ON operation state; and an OFF operation state, said tone generation method comprising the steps of:

generating a normal tone in accordance with an instruction given by said performance operation device; and starting, when said auxiliary performance operator is changed from the ON operation state to the OFF operation state while the normal tone is being generated, generation an additional tone that is related to the normal tone being generated.

20. A tone generation apparatus as claimed in claim 1 wherein said processor device is further adapted to monitor a current operation state of said auxiliary performance operator.

* * * * *